(12) United States Patent
Wang et al.

(10) Patent No.: US 12,408,167 B2
(45) Date of Patent: Sep. 2, 2025

(54) CONTROL INFORMATION TRANSMISSION METHOD, APPARATUS, AND SYSTEM

(71) Applicant: Huawei Technologies Co., Ltd., Shenzhen (CN)

(72) Inventors: Yuanquan Wang, Shanghai (CN); Jinfang Zhang, Shenzhen (CN); Lei Lu, Shanghai (CN); Wenting Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 824 days.

(21) Appl. No.: 17/701,403

(22) Filed: Mar. 22, 2022

(65) Prior Publication Data

US 2022/0217699 A1 Jul. 7, 2022

Related U.S. Application Data

(63) Continuation of application No. PCT/CN2019/107313, filed on Sep. 23, 2019.

(51) Int. Cl.
*H04L 5/00* (2006.01)
*H04W 72/04* (2023.01)
*H04W 72/0446* (2023.01)
*H04W 72/20* (2023.01)

(52) U.S. Cl.
CPC .......... *H04W 72/20* (2023.01); *H04L 5/0053* (2013.01); *H04W 72/0446* (2013.01)

(58) Field of Classification Search
CPC .. H04W 72/20; H04W 72/0446; H04L 5/0053
See application file for complete search history.

(56) References Cited

U.S. PATENT DOCUMENTS

2019/0253915 A1  8/2019  Joseph et al.

FOREIGN PATENT DOCUMENTS

| CN | 101765149 A | 6/2010 |
|----|-------------|--------|
| CN | 103687045 A | 3/2014 |
| CN | 104094623 A | 10/2014 |
| EP | 3592072 A1 | 1/2020 |
| WO | 2018156074 A1 | 8/2018 |
| WO | 2018171606 A1 | 9/2018 |

*Primary Examiner* — Gbemileke J Onamuti
(74) *Attorney, Agent, or Firm* — Leydig, Voit & Mayer, Ltd.

(57) ABSTRACT

A control information transmission method, an apparatus, and a system are provided. The method includes: a first terminal apparatus sends to a second terminal apparatus in an $i^{th}$ slot, first control information including resource indication information and decoding information, wherein i is an integer greater than or equal to 0; sends to the second terminal apparatus in an $(i+j)^{th}$ slot, second control information including the resource indication information, wherein j is an integer greater than or equal to 1 and less than or equal to N, N is an integer greater than or equal to 1; and sends first data to the second terminal apparatus in the $i^{th}$ slot and an $(i+1)^{th}$ slot to an $(i+N)^{th}$ slot based on the first control information and M pieces of second control information, wherein M is an integer greater than or equal to 1 and less than or equal to N.

20 Claims, 8 Drawing Sheets

CONTROL INFORMATION TRANSMISSION METHOD, APPARATUS, AND SYSTEM

CROSS-REFERENCE TO RELATED APPLICATIONS

This application is a continuation of International Application No. PCT/CN2019/107313, filed on Sep. 23, 2019, the disclosure of which is hereby incorporated by reference in its entirety.

TECHNICAL FIELD

This application relates to the field of network technologies, and in particular, to a control information transmission method, an apparatus, and a system.

BACKGROUND

With promotion of a 5th generation mobile communication technology (5-Generation, 5G) new radio (NR) technology in the 3rd generation partnership project (3GPP) standard organization, a lower transmission delay, a higher transmission rate, and more reliable communication are required for intelligent driving in the future. To support different service requirements, NR vehicle to everything (V2X) needs to support transmission of data information of different lengths. Therefore, it is proposed that NR V2X should support slot aggregation, that is, a plurality of slots are aggregated to transmit a same piece of data packet information. Alternatively, to provide a higher service rate, a carrier aggregation (CA) technology needs to be introduced. A plurality of contiguous or discontiguous carriers are aggregated into larger bandwidth through carrier aggregation, to meet service rate requirements. In slot aggregation or carrier aggregation, a corresponding control channel needs to be configured for resource scheduling. However, a problem that a collision of resources affects system performance or signaling overheads are high tends to occur.

SUMMARY

Embodiments of this application provide a control information transmission method, an apparatus, and a system. This not only reduces a resource collision probability and improves system performance, but also can reduce signaling overheads and improve control channel decoding reliability.

According to a first aspect, an embodiment of this application provides a control information sending method. The method includes:

A first terminal apparatus sends first control information to a second terminal apparatus in an $i^{th}$ slot, where i is an integer greater than or equal to 0, and the first control information includes resource indication information and decoding information; sends second control information to the second terminal apparatus in an $(i+j)^{th}$ slot, where j is an integer greater than or equal to 1 and less than or equal to N, N is an integer greater than or equal to 1, and the second control information includes the resource indication information; and sends first data to the second terminal apparatus in the $i^{th}$ slot and an $(i+1)^{th}$ slot to an $(i+N)^{th}$ slot based on the first control information and M pieces of second control information, where M is an integer greater than or equal to 1 and less than or equal to N. The first control information is sent in the $1^{st}$ slot, so that at least one piece of simplified second control information is sent in at least one second slot other than the $1^{st}$ slot. Therefore, not only a resource collision probability is reduced and system performance is improved, but also signaling overheads can be reduced and control channel decoding reliability can be improved.

In a possible design, M is equal to N, and the first terminal apparatus sends the first data to the second terminal apparatus in the $i^{th}$ slot and the $(i+1)^{th}$ slot to the $(i+N)^{th}$ slot based on the first control information and N pieces of second control information. In this way, all slots are aggregated to transmit a same data packet. This prevents the same data packet from being split at an upper layer, and ensures same transmission performance of the same data packet.

In another possible design, M is less than or equal to N and greater than or equal to 1, and the first terminal apparatus sends the first data to the second terminal apparatus in M slots in the $i^{th}$ slot and the $(i+1)^{th}$ slot to the $(i+N)^{th}$ slot based on the first control information and the M pieces of second control information. In this way, a part of slots are aggregated to transmit a same data packet. This prevents the same data packet from being split at an upper layer, and ensures same transmission performance of the same data packet.

In another possible design, the first control information includes first-stage control information and second-stage control information, the second control information includes the first-stage control information, the first-stage control information is the resource indication information, and the second-stage control information is the decoding information. The first-stage control information is used as simplified control information, that is, simplified control information is placed in a slot, other than the $1^{st}$ slot, in aggregated slots, so that not only a resource collision probability is reduced and system performance is improved, but also signaling overheads can be reduced and control channel decoding reliability can be improved.

In another possible design, the second control information is newly defined sidelink control information, and the newly defined sidelink control information includes the resource indication information. Simplified sidelink control information is used, so that signaling overheads are reduced and control channel decoding reliability is improved.

In another possible design, M is equal to 1, and the first terminal apparatus sends the second control information to the second terminal apparatus in the $(i+N)^{th}$ slot. Simplified control information is configured only in the last slot, so that signaling overheads are further reduced, and control channel decoding reliability is further improved.

In another possible design, the first control information includes indication information, and the indication information is used to indicate slot positions of the M pieces of second control information in the $(i+1)^{th}$ slot to the $(i+N)^{th}$ slot. If the first control information in the $1^{st}$ slot is successfully decoded, blind detection complexity of the second control information in a subsequent slot can be reduced. If the first control channel in the $1^{st}$ slot is unsuccessfully decoded, blind detection may be performed on the second control information placed in a subsequent slot, to obtain resource reservation information. This avoids a collision of resources subsequently scheduled by different users.

In another possible design, the indication information is an index value; and when the index value is 0, the first terminal apparatus sends the second control information to the second terminal apparatus in the $(i+N)^{th}$ slot; or when the index value is 1, the first terminal apparatus sends the second control information in an even slot in the $(i+1)^{th}$ slot to the $(i+N)^{th}$ slot. Different indication information carried in the first control information is used, so that a slot position of the second control information can be determined, thereby reducing blind detection complexity of the control information.

In another possible design, the resource indication information includes at least one of resource reservation information and a resource priority, and the decoding information includes at least one of hybrid automatic repeat request HARQ related information and a modulation and coding scheme MCS. This ensures that data is successfully received and decoded.

In another possible design, the first terminal apparatus sends the first control information to the second terminal apparatus in a first slot, where the first control information includes the resource indication information and the decoding information; sends at least one piece of second control information to the second terminal apparatus in at least one second slot, where the at least one piece of second control information includes the resource indication information; and sends the first data to the second terminal apparatus in the $i^{th}$ slot and the at least one second slot based on the first control information and the at least one piece of second control information. The first control information is sent in the $1^{st}$ slot, so that the at least one piece of simplified second control information is sent in the at least one second slot other than the $1^{st}$ slot. Therefore, not only a resource collision probability is reduced and system performance is improved, but also signaling overheads can be reduced and control channel decoding reliability can be improved.

According to a second aspect, an embodiment of this application provides a control information sending method. The method includes:

A first terminal apparatus sends first control information to a second terminal apparatus in an $i^{th}$ frequency domain unit, where i is an integer greater than or equal to 0, and the first control information includes resource indication information and decoding information; sends second control information to the second terminal apparatus in an $(i+j)^{th}$ frequency domain unit, where j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information includes the resource indication information; and send first data to the second terminal apparatus in an $(i-N_2)^{th}$ frequency domain unit to an $(i+N_1)^{th}$ frequency domain unit based on the first control information and M pieces of second control information, where M is an integer greater than or equal to 1 and less than or equal to $(N_1+N_2)$. The first control information is sent in a first frequency domain unit, so that at least one piece of simplified second control information is sent in at least one second frequency domain unit other than the first frequency domain unit. Therefore, not only a resource collision probability is reduced and system performance is improved, but also signaling overheads can be reduced and control channel decoding reliability can be improved.

In a possible design, M is equal to $N_1+N_2$, and the first terminal apparatus sends the first data to the second terminal apparatus in the $(i-N_2)^{th}$ frequency domain unit to the $(i+N_1)^{th}$ frequency domain unit based on the first control information and $N_1+N_2$ pieces of second control information. In this way, all frequency domain units are aggregated into one to transmit a same data packet. This increases data transmission bandwidth and increases a data transmission rate.

In another possible design, M is less than or equal to $N_1+N_2$ and greater than or equal to 1, and the first terminal apparatus sends the first data to the second terminal apparatus in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information. In this way, a part of frequency domain units are aggregated into one to transmit a same data packet. This increases data transmission bandwidth and increases a data transmission rate.

In another possible design, the first control information includes first-stage control information and second-stage control information, the second control information includes the first-stage control information, the first-stage control information is the resource indication information, and the second-stage control information is the decoding information. The first-stage control information is used as simplified control information, that is, the simplified control information is placed in a frequency domain unit, other than a primary frequency domain unit, in aggregated frequency domain units, so that not only a resource collision probability is reduced and system performance is improved, but also signaling overheads can be reduced and control channel decoding reliability can be improved.

In another possible design, the second control information is newly defined sidelink control information, and the newly defined sidelink control information includes the resource indication information. Simplified sidelink control information is used, so that signaling overheads are reduced and control channel decoding reliability is improved.

In another possible design, the first control information includes indication information, and the indication information is used to indicate frequency domain unit positions of the M pieces of second control information in the $(i-N_2)^{th}$ frequency domain unit to the $(i+N_1)^{th}$ frequency domain unit except the $i^{th}$ frequency domain unit. If the first control information in the $i^{th}$ frequency domain unit is successfully decoded, blind detection complexity of the second control information placed in another frequency domain unit can be reduced. If the first control channel in the $i^{th}$ frequency domain unit is unsuccessfully decoded, blind detection may be performed on the second control information placed in another frequency domain unit, to obtain periodic resource reservation information. This avoids a collision of resources subsequently scheduled by different users.

In another possible design, the indication information is an index value; and when the index value is 0, the first terminal apparatus sends the second control information to the second terminal apparatus in the $(i+N_1)^{th}$ frequency domain unit; when the index value is 1, the first terminal apparatus sends the second control information in an even frequency domain unit in the $(i-N_2)^{th}$ frequency domain unit to the $(i+N_1)^{th}$ frequency domain unit except the $i^{th}$ frequency domain unit; when the index value is 2, the first terminal apparatus sends the second control information in an odd frequency domain unit in the $(i-N_2)^{th}$ frequency domain unit to the $(i+N_1)^{th}$ frequency domain unit except the $i^{th}$ frequency domain unit; or when the index value is 3, the first terminal apparatus sends the second control information in the $(i-N_2)^{th}$ frequency domain unit to the $(i+N_1)^{th}$ frequency domain unit except the $i^{th}$ frequency domain unit. Different indication information carried in the first control information is used, so that a frequency domain unit position of the second control information can be determined, thereby reducing blind detection complexity of the control information.

In another possible design, the resource indication information includes at least one of resource reservation information and a resource priority, and the decoding information includes at least one of hybrid automatic repeat request HARQ related information and a modulation and coding scheme MCS. This ensures that data is successfully received and decoded.

In another possible design, the first terminal apparatus may send the first control information to the second terminal apparatus in the first frequency domain unit, where the first control information includes the resource indication information and the decoding information; and sends at least one piece of second control information to the second terminal apparatus in at least one second frequency domain unit, where the second control information includes the resource indication information. Finally, the first data is sent to the second terminal apparatus in the first frequency domain unit and the at least one second frequency domain unit based on the first control information and the at least one piece of second control information. The first control information is sent in the first frequency domain unit, so that the at least one piece of simplified second control information is sent in the at least one second frequency domain unit other than the first frequency domain unit. Therefore, not only a resource collision probability is reduced and system performance is improved, but also signaling overheads can be reduced and control channel decoding reliability can be improved.

According to a third aspect, an embodiment of this application provides a control information receiving method. The method includes: A second terminal apparatus receives, in an $i^{th}$ slot, first control information sent by a first terminal apparatus, where i is an integer greater than or equal to 0, and the first control information includes resource indication information and decoding information; receives, in an $(i+j)^{th}$ slot, second control information sent by the first terminal apparatus, where j is an integer greater than or equal to 1 and less than or equal to N, N is an integer greater than or equal to 1, and the second control information includes the resource indication information; and receives, in the $i^{th}$ slot and an $(i+1)^{th}$ slot to an $(i+N)^{th}$ slot based on the first control information and M pieces of second control information, first data sent by the first terminal apparatus, where M is an integer greater than or equal to 1 and less than or equal to N. The first control information is received in the $1^{st}$ slot, so that at least one piece of simplified second control information is received in at least one second slot other than the $1^{st}$ slot. Therefore, not only a resource collision probability is reduced and system performance is improved, but also signaling overheads can be reduced and control channel decoding reliability can be improved.

In a possible design, M is equal to N, and the second terminal apparatus receives, in the $i^{th}$ slot and the $(i+1)^{th}$ slot to the $(i+N)^{th}$ slot based on the first control information and N pieces of second control information, the first data sent by the first terminal apparatus. In this way, all slots are aggregated to transmit a same data packet. This prevents the same data packet from being split at an upper layer, and ensures same transmission performance of the same data packet.

In another possible design, M is less than or equal to N and greater than or equal to 1, and the second terminal apparatus receives, in M slots in the $i^{th}$ slot and the $(i+1)^{th}$ slot to the $(i+N)^{th}$ slot based on the first control information and the M pieces of second control information, the first data sent by the first terminal apparatus. In this way, a part of slots are aggregated to transmit a same data packet. This prevents the same data packet from being split at an upper layer, and ensures same transmission performance of the same data packet.

In another possible design, the first control information includes first-stage control information and second-stage control information, the second control information includes the first-stage control information, the first-stage control information is the resource indication information, and the second-stage control information is the decoding information. The first-stage control information is used as simplified control information, that is, simplified control information is placed in a slot, other than the $1^{st}$ slot, in aggregated slots, so that not only a resource collision probability is reduced and system performance is improved, but also signaling overheads can be reduced and control channel decoding reliability can be improved.

In another possible design, the second control information is newly defined sidelink control information, and the newly defined sidelink control information includes the resource indication information. Simplified sidelink control information is used, so that signaling overheads are reduced and control channel decoding reliability is improved.

In another possible design, M is equal to 1, and the second terminal apparatus receives, in the $(i+N)^{th}$ slot, the second control information sent by the first terminal apparatus. Simplified control information is configured only in the last slot, so that signaling overheads are further reduced, and control channel decoding reliability is further improved.

In another possible design, the first control information includes indication information, and the indication information is used to indicate slot positions of the M pieces of second control information in the $(i+1)^{th}$ slot to the $(i+N)^{th}$ slot. If the first control information in the $1^{st}$ slot is successfully decoded, blind detection complexity of the second control information in a subsequent slot can be reduced. If the first control channel in the $1^{st}$ slot is unsuccessfully decoded, blind detection may be performed on the second control information placed in a subsequent slot, to obtain resource reservation information. This avoids a collision of resources subsequently scheduled by different users.

In another possible design, the indication information is an index value; and when the index value is 0, the second terminal apparatus receives, in the $(i+N)^{th}$ slot, the second control information sent by the first terminal apparatus; or when the index value is 1, the second terminal apparatus receives the second control information in an even slot in the $(i+1)^{th}$ slot to the $(i+N)^{th}$ slot. Different indication information carried in the first control information is used, so that a slot position of the second control information can be determined, thereby reducing blind detection complexity of the control information.

In another possible design, the resource indication information includes at least one of resource reservation information and a resource priority, and the decoding information includes at least one of hybrid automatic repeat request (HARQ) related information and a modulation and coding scheme (MCS). This ensures that data is successfully received and decoded.

According to a fourth aspect, an embodiment of this application provides a control information receiving method. The method includes: A second terminal apparatus receives, in an $i^{th}$ frequency domain unit, first control information sent by a first terminal apparatus, where i is an integer greater than or equal to 0, and the first control information includes resource indication information and decoding information; receives, in an $(i+j)^{th}$ frequency domain unit, second control information sent by the first terminal apparatus, where j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information includes the resource indication information; and receives, in an $(i-N_2)^{th}$ frequency domain unit to an $(i+N_1)^{th}$ frequency domain unit based on the first control information and M pieces of second control information, first data sent by the first terminal apparatus, where M is an integer greater than or equal to 1 and less than or equal to $(N_1+N_2)$. The first control information is received in a first frequency domain unit, so that at least one piece of simplified second control information is received in at least one second frequency domain unit other than the first frequency domain unit. Therefore, not only a resource collision probability is reduced and system performance is improved, but also signaling overheads can be reduced and control channel decoding reliability can be improved.

In a possible design, M is equal to $N_1+N_2$, and the second terminal apparatus receives, in the $(i-N_2)^{th}$ frequency domain unit to the $(i+N_1)^{th}$ frequency domain unit based on the first control information and $N_1+N_2$ pieces of second control information, the first data sent by the first terminal apparatus. In this way, all frequency domain units are aggregated into one to transmit a same data packet. This increases data transmission bandwidth and increases a data transmission rate.

In another possible design, M is less than or equal to $N_1+N_2$ and greater than or equal to 1, and the second terminal apparatus receives, in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information, the first data sent by the first terminal apparatus. In this way, a part of frequency domain units are aggregated into one to transmit a same data packet. This increases data transmission bandwidth and increases a data transmission rate.

In another possible design, the first control information includes first-stage control information and second-stage control information, the second control information includes the first-stage control information, the first-stage control information is the resource indication information, and the second-stage control information is the decoding information. The first-stage control information is used as simplified control information, that is, the simplified control information is placed in a frequency domain unit, other than a primary frequency domain unit, in aggregated frequency domain units, so that not only a resource collision probability is reduced and system performance is improved, but also signaling overheads can be reduced and control channel decoding reliability can be improved.

In another possible design, the second control information is newly defined sidelink control information, and the newly defined sidelink control information includes the resource indication information. Simplified sidelink control information is used, so that signaling overheads are reduced and control channel decoding reliability is improved.

In another possible design, the first control information includes indication information, and the indication information is used to indicate frequency domain unit positions of the M pieces of second control information in the $(i-N_2)^{th}$ frequency domain unit to the $(i+N_1)^{th}$ frequency domain unit except the $i^{th}$ frequency domain unit. If the first control information in the $i^{th}$ frequency domain unit is successfully decoded, blind detection complexity of the second control information placed in another frequency domain unit can be reduced. If the first control channel in the $i^{th}$ frequency domain unit is unsuccessfully decoded, blind detection may be performed on the second control information placed in another frequency domain unit, to obtain periodic resource reservation information. This avoids a collision of resources subsequently scheduled by different users.

In another possible design, the indication information is an index value; and when the index value is 0, the second terminal apparatus receives, in the $(i+N_1)^{th}$ frequency domain unit, the second control information sent by the first terminal apparatus; when the index value is 1, the second terminal apparatus receives the second control information in an even frequency domain unit in the $(i-N_2)^{th}$ frequency domain unit to the $(i+N_1)^{th}$ frequency domain unit except the $i^{th}$ frequency domain unit; when the index value is 2, the second terminal apparatus receives the second control information in an odd frequency domain unit in the $(i-N_2)^{th}$ frequency domain unit to the $(i+N_1)^{th}$ frequency domain unit except the $i^{th}$ frequency domain unit; or when the index value is 3, the second terminal apparatus receives the second control information in the $(i-N_2)^{th}$ frequency domain unit to the $(i+N_1)^{th}$ frequency domain unit except the $i^{th}$ frequency domain unit. Different indication information carried in the first control information is used, so that a frequency domain unit position of the second control information can be determined, thereby reducing blind detection complexity of the control information.

In another possible design, the resource indication information includes at least one of resource reservation information and a resource priority, and the decoding information includes at least one of hybrid automatic repeat request HARQ related information and a modulation and coding scheme MCS. This ensures that data is successfully received and decoded.

According to a fifth aspect, an embodiment of this application provides a first terminal apparatus. The first terminal apparatus is configured to implement the methods and functions performed by the first terminal apparatus in the first aspect and the second aspect, and the methods and functions are implemented by hardware/software. The hardware/software includes modules corresponding to the foregoing functions.

According to a sixth aspect, an embodiment of this application provides a second terminal apparatus. The second terminal apparatus is configured to implement
  the methods and functions performed by the second terminal apparatus in the third aspect and the fourth aspect, and the methods and functions are implemented by hardware/software. The hardware/software includes modules corresponding to the foregoing functions.

According to a seventh aspect, this application provides a computer-readable storage medium. The computer-readable storage medium stores instructions; and when the instructions are run on a computer, the computer is enabled to perform the method according to any one of the foregoing aspects.

According to an eighth aspect, this application provides a computer program product. The computer program product is configured to store a computer program; and when the computer program is run on a computer, the computer is enabled to perform the method according to any one of the foregoing aspects.

According to a ninth aspect, this application provides a chip. The chip includes a processor, configured to: invoke instructions from a memory and run the instructions stored in the memory, so that a terminal device in which the chip is installed performs the method according to any one of the foregoing aspects.

According to a tenth aspect, this application provides another chip. The chip may be a chip in a first terminal apparatus or a second terminal apparatus. The chip includes an input interface, an output interface, and a processing circuit. The input interface, the output interface, and the circuit are connected through an internal connection path. The processing circuit is configured to perform the method according to any one of the foregoing aspects.

According to an eleventh aspect, this application provides another chip. The chip includes an input interface, an output interface, and a processor. Optionally, the chip further includes a memory. The input interface, the output interface, the processor, and the memory are connected through an internal connection path. The processor is configured to execute code in the memory. When the code is executed, the processor is configured to perform the method according to any one of the foregoing aspects.

According to a twelfth aspect, an embodiment of this application provides a communication apparatus. The communication apparatus includes a memory, configured to store instructions; and at least one processor, configured to: invoke the instructions from the memory and run the instructions, so that the communication apparatus implements the steps according to any one of the foregoing aspects.

According to a thirteenth aspect, an embodiment of this application provides a communication system. The communication system includes the first terminal apparatus according to any one of the foregoing aspects and the second terminal apparatus according to any one of the foregoing aspects.

BRIEF DESCRIPTION OF DRAWINGS

To describe technical solutions in embodiments or the background of this application more clearly, the following describes the accompanying drawings used in the embodiments or the background of this application.

DESCRIPTION OF EMBODIMENTS

The following describes embodiments of this application with reference to accompanying drawings in the embodiments of this application.

Figure 1:
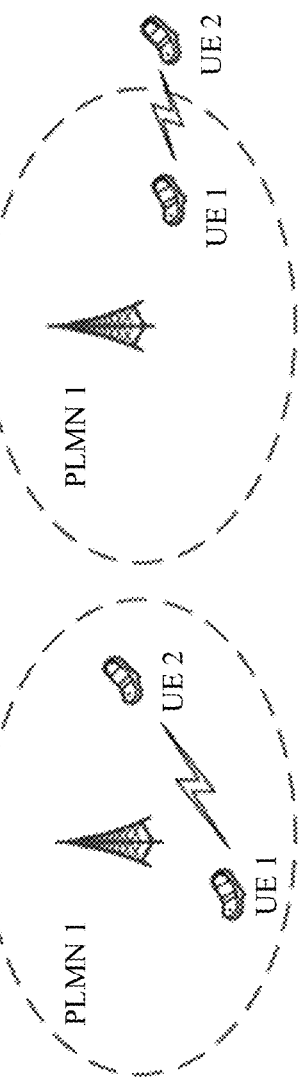
FIG. 1a, FIG. 1b, and FIG. 1c are a schematic diagram of a structure of a communication system according to an embodiment of this application.

FIG. 1a, FIG. 1b, and FIG. 1c are a schematic diagram of a structure of a communication system according to an embodiment of this application. The communication system includes a first terminal apparatus, a second terminal apparatus, and a network device. The first terminal apparatus may directly communicate with the second terminal apparatus, or may communicate with the second terminal apparatus through the network device. The first terminal apparatus and the second terminal apparatus may be devices that provide a voice and/or data connection to a user, may be connected to a computing device such as a laptop computer or a desktop computer, or may be independent devices such as personal digital assistants (PDAs). Both the first terminal apparatus and the second terminal apparatus may be user equipments (UEs), for example, vehicles, subscriber units, subscriber stations, mobile stations, remote stations, access points, remote terminals, access terminals, user terminals, user agents or user apparatuses, vehicle-mounted terminals, or vehicles having V2V communication capabilities. Both the first terminal apparatus and the second terminal apparatus may be chips, for example, processors. The network device may be a base station, an access point, a NodeB, an evolved NodeB (eNB), or a 5G base station (next generation base station, gNB), and is a device, in an access network, that communicates with a wireless terminal over an air interface by using one or more sectors. By converting a received air interface frame into an IP packet, the base station may serve as a router between the wireless terminal and a remaining part of the access network, and the access network may include an internet protocol network. The base station may further coordinate attribute management for the air interface.

The communication system may be applied to an NR-V2X system, or may be applied to another communication system. The communication system may be applied to a scenario in which a plurality of slots are aggregated or a plurality of carriers are aggregated. The communication system is mainly used for sidelink (sidelink) communication between user equipments. UE 1 and UE 2 may be located in coverage (a) of a same cell, may be located in coverage (b) of different cells, or may be located in non-mobile network coverage (c). A configuration of a communication link and a communication resource between the UE 1 and the UE 2 may be configured by the user equipment, or may be configured by the network device.

The communication system may use a public land mobile network (PLMN), a device-to-device (D2D) network, a machine-to-machine (M2M) network, an internet of things (IoT), or another network. The communication system may be applied to a 5G NR system, or may be applied to a non-terrestrial communication network, for example, a communication network in which a base station is located on a satellite or another flight device, or a communication network in which a satellite or a flight device is used as a relay for forwarding.

With development of wireless communication technologies, people have increasing requirements for a high data transmission rate and user experience, and have increasing requirements for a proximity service for knowing people or things around and communicating with them. Therefore, a D2D communication technology emerges accordingly. Application of the D2D technology can lighten load of a cellular network, reduce battery power consumption of user equipment, improve a data transmission rate, and better meet a requirement for a proximity service. The D2D technology allows a plurality of UEs that support a D2D function to perform direct discovery and direct communication regardless of whether there is a network infrastructure. In view of features and advantages of the D2D technology, an internet of vehicles application scenario based on the D2D technology is proposed. However, considering security, a delay requirement is quite high in this scenario, and cannot be implemented by using the existing D2D technology.

Therefore, in a network of a long term evolution (LTE) technology proposed by the 3GPP, a V2X internet of vehicles technology is proposed. V2X communication is communication between a vehicle and anything outside, and includes vehicle to vehicle (V2V) communication, vehicle to pedestrian (V2P) communication, vehicle to infrastructure (V2I) communication, and vehicle to network (V2N) communication.

The V2X communication is intended for high-speed devices representative of vehicles, and is a basic and key technology to be used in future scenarios that have a quite high delay requirement in communication, such as scenarios of smart vehicles, autonomous driving, and intelligent transportation systems. LTE V2X communication may support a communication scenario in which there is network coverage and a communication scenario in which there is no network coverage, and a resource allocation manner of the LTE V2X communication may be a network access device scheduling mode, for example, an evolved universal terrestrial radio access network NodeB (E-UTRAN Node B, eNB) scheduling mode and a UE self-selection mode. Based on a V2X technology, vehicle user equipment (vehicle UE, V-UE) can send some information, for example, information, such as a position, a speed, and an intention (for example, turning, paralleling, or reversing), triggered by periodic events and information triggered by some aperiodic events, of the vehicle user equipment to surrounding V-UE. Similarly, the V-UE also receives information about a surrounding user in real time. The 3GPP standard organization officially published a first version the LTE V2X standard, namely, LTE Release (Release) 14 in early 2017.

LTE V2X meets some basic requirements in a V2X scenario. However, existing LTE V2X cannot effectively support an application scenario such as fully intelligent driving or autonomous driving in the future. 5G NR V2X further develops with promotion of 5G NR technologies in the 3GPP standard organization. Future intelligent driving requires a lower transmission delay, a higher transmission rate, more reliable communication, better user experience, and more extensive service support. To meet different service requirements, NR-V2X also needs to support transmission of data information of different lengths. A size of a data packet may range from several bytes to 6500 bytes, and consequently a same data packet may not be transmitted in a same slot. Therefore, it is proposed that NR-V2X should support slot aggregation, that is, a plurality of slots are aggregated to transmit information about a same piece of data packet information. In addition, in NR V2X, some scenarios, such as high definition map download and massive sensor data sharing, have quite high rate requirements. In the foregoing scenarios, to provide a higher service rate, a carrier aggregation technology needs to be introduced. A plurality of contiguous or discontiguous carriers are aggregated into larger bandwidth through carrier aggregation, to meet service rate requirements.

Figure 2:
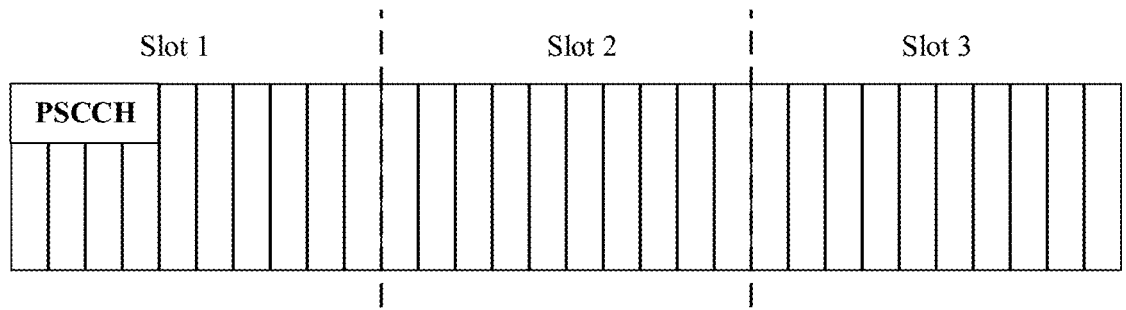
FIG. 2 is a schematic diagram of a PSCCH obtained through slot aggregation.

FIG. 2 is a schematic diagram of a PSCCH obtained through slot aggregation. When a service data packet cannot be transmitted in a same slot because the service data packet is excessively large, to ensure reliability of a specific service data packet, a plurality of contiguous or discontiguous slots are used for transmission, and each slot uses a same modulation and coding scheme (MCS) and a same bit rate. In this way, similar performance can be obtained for each slot. On an NR sidelink, a physical channel may include a physical sidelink control channel (PSCCH), a physical sidelink shared channel (PSSCH), a physical sidelink feedback channel (PSFCH), and the like. Control information carried on the PSCCH is placed only in the $1^{st}$ slot in aggregated slots, and remaining slots do not include a control channel, and share the control information in the $1^{st}$ slot. As shown in FIG. 2, if three slots are aggregated to transmit a same piece of data packet information, a control channel is placed only in the $1^{st}$ slot, and no control channel is placed in the $2^{nd}$ slot and the $3^{rd}$ slot, control information carried on the $1^{st}$ control channel is shared. The control information not only includes time-frequency domain resource indication information related to resource reservation and scheduling, but also includes PSSCH decoding related information.

Figure 3:
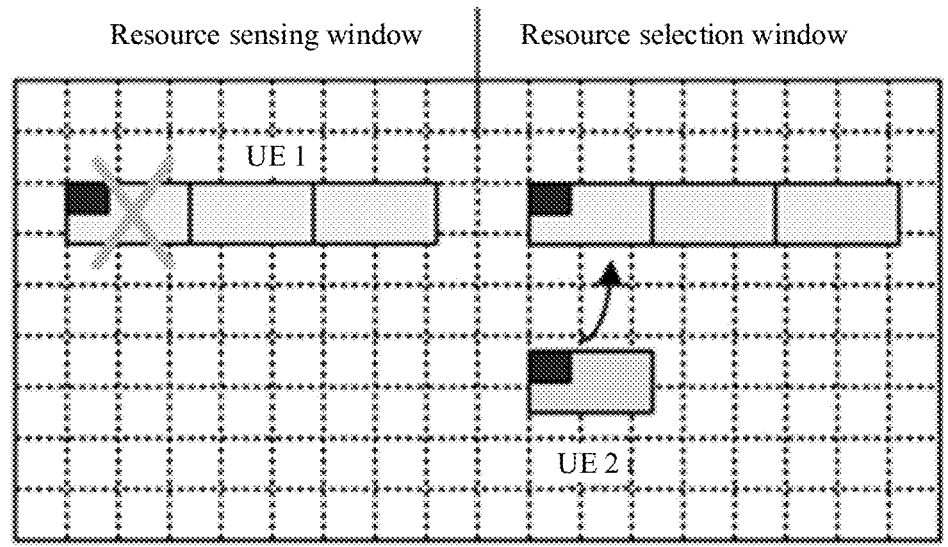
FIG. 3 is a schematic diagram of a collision of resources.

Alternatively, as shown in FIG. 3, if a control channel is configured only in the 1 st slot, the control channel includes resource reservation information, that is, a time-frequency resource for next transmission is reserved. In a resource sensing window, if control information in the $1^{st}$ slot is lost, other user equipments cannot obtain the control information from remaining two slots, and consequently cannot obtain the resource reservation information. A collision of resources may occur between UE 1 and UE 2 shown in the figure in a resource selection window for next transmission. Because a plurality of slots are transmitted for one time of slot aggregation, compared with single-slot transmission, a collision probability is greatly increased, and system performance is affected.

Figure 4:
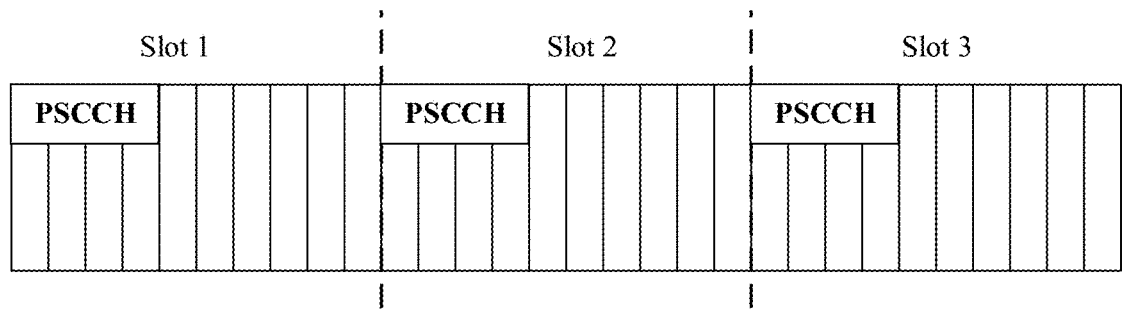
FIG. 4 is another schematic diagram of a PSCCH obtained through slot aggregation.

FIG. 4 is another schematic diagram of a PSCCH obtained through slot aggregation. One data packet may be split into a plurality of sub data packets, and each sub data packet is transmitted in one slot. In this scenario, a control channel needs to be carried in each slot, and each control channel occupies a same physical resource. Each control channel needs to carry a data channel decoding related parameter in addition to resource reservation information. Currently, in NR, a size of V2X sidelink control information is estimated to be about 120 bits, and a control channel of a same size is configured in each slot. As a result, control signaling overheads are greatly increased. As shown in FIG. 4, control channels are carried in three slots, and 360 bits need to be occupied. Consequently, a high control channel bit rate is used on a limited physical resource, and control channel decoding reliability is reduced.

To resolve the foregoing technical problems, the embodiments of this application provide the following solutions.

Figure 5:
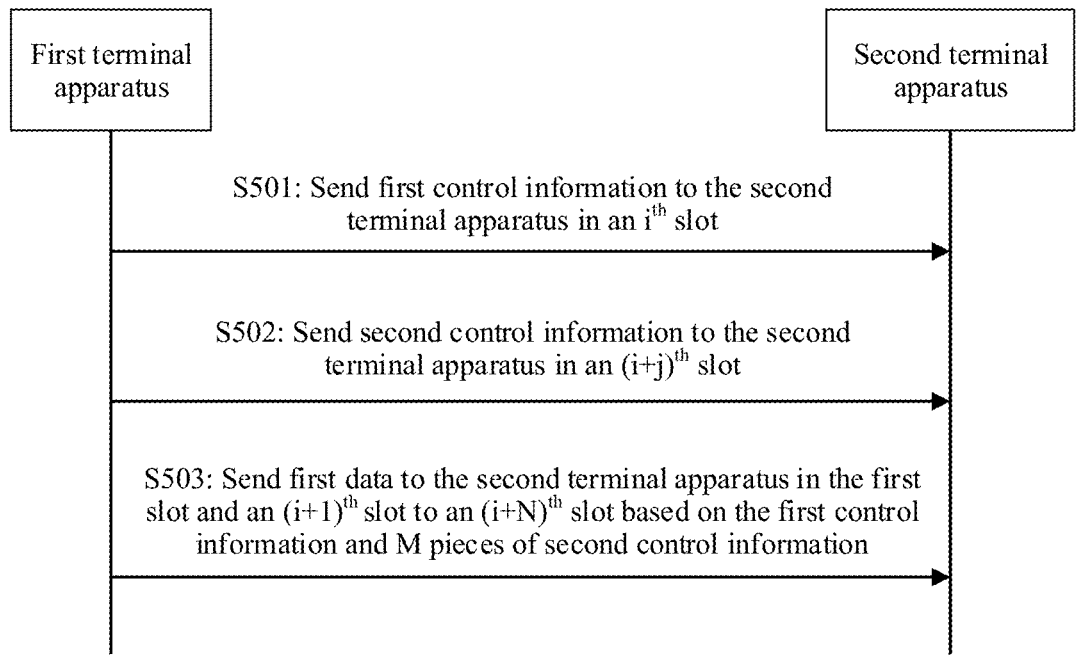
FIG. 5 is a schematic flowchart of a control information sending method according to an embodiment of this application.

FIG. 5 is a schematic flowchart of a control information sending method according to an embodiment of this application. This embodiment of this application includes at least the following steps.

S501: A first terminal apparatus sends first control information to a second terminal apparatus in an $i^{th}$ slot, and the second terminal apparatus receives, in the $i^{th}$ slot, the first control information sent by the first terminal apparatus, where i is an integer greater than or equal to 0, and the first control information includes resource indication information and decoding information.

S502: The first terminal apparatus sends second control information to the second terminal apparatus in an $(i+j)^{th}$ slot, and the second terminal apparatus receives, in the $(i+j)^{th}$ slot, the second control information sent by the first terminal apparatus, where j is an integer greater than or equal to 1 and less than or equal to N, N is a quantity of all slots other than the $i^{th}$ slot, N is an integer greater than or equal to 1, and the second control information includes the resource indication information.

The first control information and the second control information may be carried on a PSCCH. The first control information is normal control information, and the first control information may include not only the resource indication information, for example, resource reservation information and a resource priority, but also the decoding information of a data channel, for example, retransmission related information (hybrid automatic repeat request, HARQ) and a modulation and coding scheme (modulation and coding scheme, MCS). The second control information is simplified control information, and may include only the resource indication information, but does not include the decoding information of the data channel. Therefore, a signaling length of the second control information is reduced.

Figure 6:
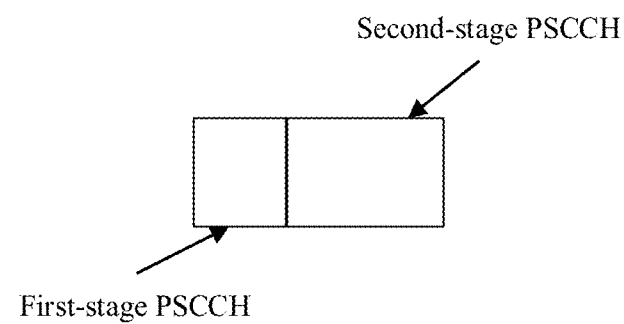
FIG. 6 is a schematic diagram of a two-stage control channel according to an embodiment of this application.

Optionally, the first control information includes first-stage control information and second-stage control information, the second control information includes the first-stage control information, the first-stage control information is the resource indication information, for example, the resource reservation information and the resource priority, and the second-stage control information is the decoding information, for example, the retransmission related information HARQ and the MCS. The first-stage control information is carried on a first-stage control channel, and the second-stage control information is carried on a second-stage control channel. FIG. 6 is a schematic diagram of a two-stage control channel according to an embodiment of this application. A first-stage PSCCH is used to transmit resource indication information such as resource reservation information, a time-frequency resource indication, and a priority, and the first-stage PSCCH may be used as a simplified control channel. A second-stage PSCCH is used to transmit decoding information of a data channel, and the second-stage PSCCH is applicable to scenarios, such as unicast and multicast services, that need other special signaling.

Optionally, the second control information may be newly defined sidelink control information (sidelink control information, SCI), and the newly defined SCI may include the decoding information.

It should be noted that the first control information and the second control information may be configured by a network device (for example, a base station) and then sent to the first terminal device, or may be configured by the first terminal device.

Figure 7:
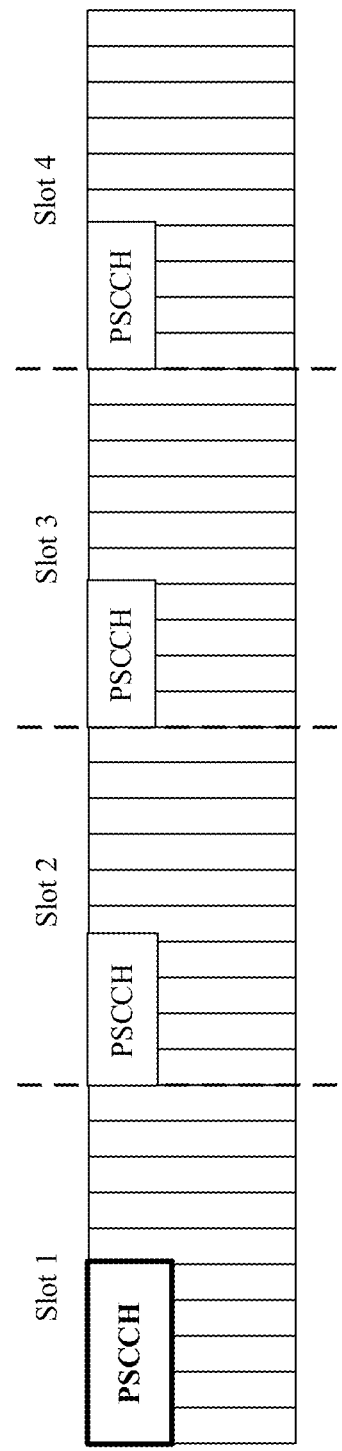
FIG. 7 is a schematic diagram of a PSCCH configuration according to an embodiment of this application.

Optionally, when M is equal to N, the first terminal apparatus may send the second control information to the second terminal apparatus in an $(i+1)^{th}$ slot to an $(i+N)^{th}$ slot. M is a quantity of pieces of second control information, and M is an integer greater than or equal to 1 and less than or equal to N. For example, FIG. 7 is a schematic diagram of a PSCCH configuration according to an embodiment of this application. If the first terminal apparatus uses four slots (for example, a slot 1, a slot 2, a slot 3, and a slot 4) to transmit a same data packet, the first terminal apparatus may send the first control information in the slot 1, and send the second control information in the slot 2, the slot 3, and the slot 4.

Figure 8:
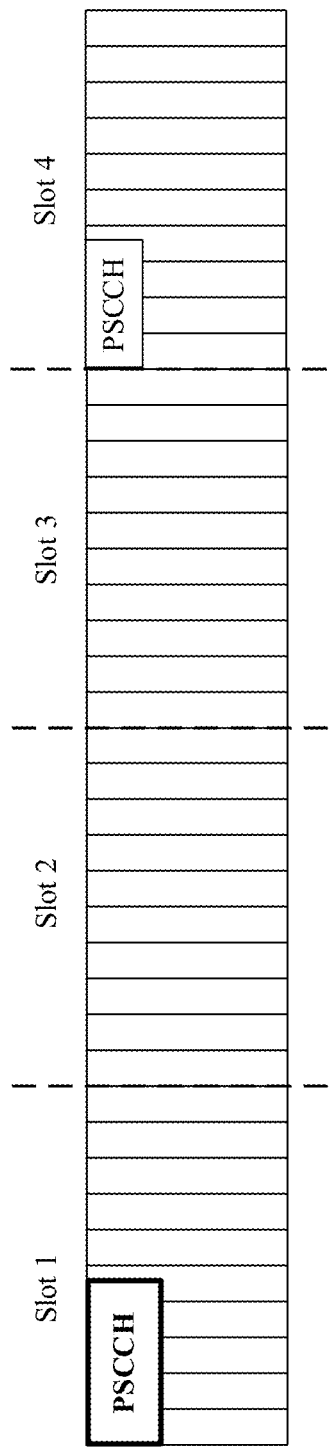
FIG. 8 is a schematic diagram of another PSCCH configuration according to an embodiment of this application.

Optionally, when M is equal to 1, the first terminal apparatus sends the second control information to the second terminal apparatus in an $(i+N)^{th}$ slot (the last slot). For example, FIG. 8 is a schematic diagram of another PSCCH configuration according to an embodiment of this application. If the first terminal apparatus uses four slots (for example, a slot 1, a slot 2, a slot 3, and a slot 4) to transmit a same data packet, the first terminal apparatus may send the first control information in the slot 1, and send the second control information in the slot 4 (the last slot), but no control information is carried in the slot 2 and the slot 3. In this way, not only a resource collision probability is reduced, but also signaling overheads can be further reduced.

Optionally, the first control information includes indication information, and the indication information is used to indicate slot positions of M pieces of second control information in the $(i+1)^{th}$ slot to the $(i+N)^{th}$ slot. The indication information is added to the first control information placed in the $1^{st}$ slot, to indicate a configuration status of the second control information in a subsequent slot. If the first control information in the $1^{st}$ slot is successfully decoded, blind detection complexity of the second control information in the subsequent slot can be reduced. If the first control channel in the $1^{st}$ slot is unsuccessfully decoded, blind detection may be performed on the second control information placed in the subsequent slot, to obtain the resource reservation information. This avoids a collision of resources subsequently scheduled by different users.

By default, if the first control information carries no indication information or does not need to be indicated, the second control information is sent in all aggregated slots in the $(i+1)^{th}$ slot to the $(i+N)^{th}$ slot.

The indication information is an index value, and one or two bits may be used to indicate the index value. For example, two bits are used to indicate an index value, to be specific, bits 00 indicate an index value 0, and bits 01 indicate an index value 1.

Further, when the index value is 0, the first terminal apparatus sends the second control information to the second terminal apparatus in the $(i+N)^{th}$ slot, that is, sends the second control information in the last slot. For example, when the index value is 0, if four slots (for example, a slot 1, a slot 2, a slot 3, and a slot 4) are used to transmit a same data packet, the first terminal apparatus may send the first control information in the slot 1, and send the second control information in the slot 4 (the last slot), but no control information is carried in the slot 2 and the slot 3. Alternatively, when the index value is 1, the first terminal apparatus sends the second control information in an even slot in the $(i+1)^{th}$ slot to the $(i+N)^{th}$ slot. For example, if the first terminal apparatus uses eight slots (for example, a slot 1, a slot 2, a slot 3, a slot 4, a slot 5, a slot 6, a slot 7, and a slot 8) to transmit a same data packet, when the index value is 1, the first terminal apparatus may send the first control information in the slot 1, and send the second control information in the slot 3, the slot 5, and the slot 7, but no control information is carried in the slot 2, the slot 4, the slot 6, and the slot 8. It should be noted that, the indication information includes but is not limited to the foregoing two index values, and may further include another index value, to respectively indicate different slot positions.

Optionally, the first terminal apparatus may send the first control information to the second terminal apparatus in a first slot, where the first control information includes the resource indication information and the decoding information; and send at least one piece of second control information to the second terminal apparatus in at least one second slot, where the second control information includes the resource indication information. A specific implementation method is the same as the foregoing method, and details are not described herein again.

S503: The first terminal apparatus may send first data to the second terminal apparatus in the $i^{th}$ slot and the $(i+1)^{th}$ slot to the $(i+N)^{th}$ slot based on the first control information and the M pieces of second control information. After receiving the first control information and the M pieces of second control information, the second terminal apparatus may receive, in the $i^{th}$ slot and the $(i+1)^{th}$ slot to the $(i+N)^{th}$ slot based on the first control information and the M pieces of second control information, the first data sent by the first terminal apparatus, and decode the received first data based on the first control information and the M pieces of second control information. M is an integer greater than or equal to 1 and less than or equal to N, and the first data may be a service data packet.

During specific implementation, the first terminal apparatus may aggregate all slots in the $i^{th}$ slot to the $(i+N)^{th}$ slot to transmit the first data; or may select a part of slots from the $i^{th}$ slot to the $(i+N)^{th}$ slot, and aggregate the part of slots to transmit the first data. The aggregated slots may be contiguous slots, or may be discontiguous slots.

Optionally, M is equal to N, and the first terminal apparatus may send the first data to the second terminal apparatus in the $i^{th}$ slot and the $(i+1)^{th}$ slot to the $(i+N)^{th}$ slot based on the first control information and N pieces of second control information, that is, aggregate all slots to transmit a same service data packet. For example, if N=3 and M=3, it indicates that the first terminal apparatus may send the first control information in the $1^{st}$ slot (the slot 1), send the second control information in all slots other than the $1^{st}$ slot (the slot 2, the slot 3, and the slot 4), and aggregate the slot 1, the slot 2, the slot 3, and the slot 4 to transmit a same service data packet.

Optionally, M is less than or equal to N and greater than or equal to 1, and the first terminal apparatus sends the first data to the second terminal apparatus in M slots in the $i^{th}$ slot and the $(i+1)^{th}$ slot to the $(i+N)^{th}$ slot based on the first control information and the M pieces of second control information, that is, aggregates a part of the slots to transmit a same service data packet. For example, if N=3 and M=2, it indicates that the first terminal apparatus may send the first control information in the $1^{st}$ slot (the slot 1), then randomly select two slots (for example, the slot 2 and the slot 4) from all slots other than the $1^{st}$ slot, send the second control information in the slot 2 and the slot 4, and aggregate the slot 1, the slot 2, and the slot 4 to transmit a same service data packet.

Optionally, the first terminal apparatus may send the first data to the second terminal apparatus in the first slot and the at least one second slot based on the first control information and the at least one piece of second control information. A specific implementation method is the same as the foregoing method, and details are not described herein again.

In this embodiment of this application, the first control information is sent in the 1 st slot, so that the at least one piece of simplified second control information is sent in the at least one second slot other than the $1^{st}$ slot. Therefore, not only a resource collision probability is reduced and system performance is improved, but also signaling overheads can be reduced and control channel decoding reliability can be improved.

Figure 9:
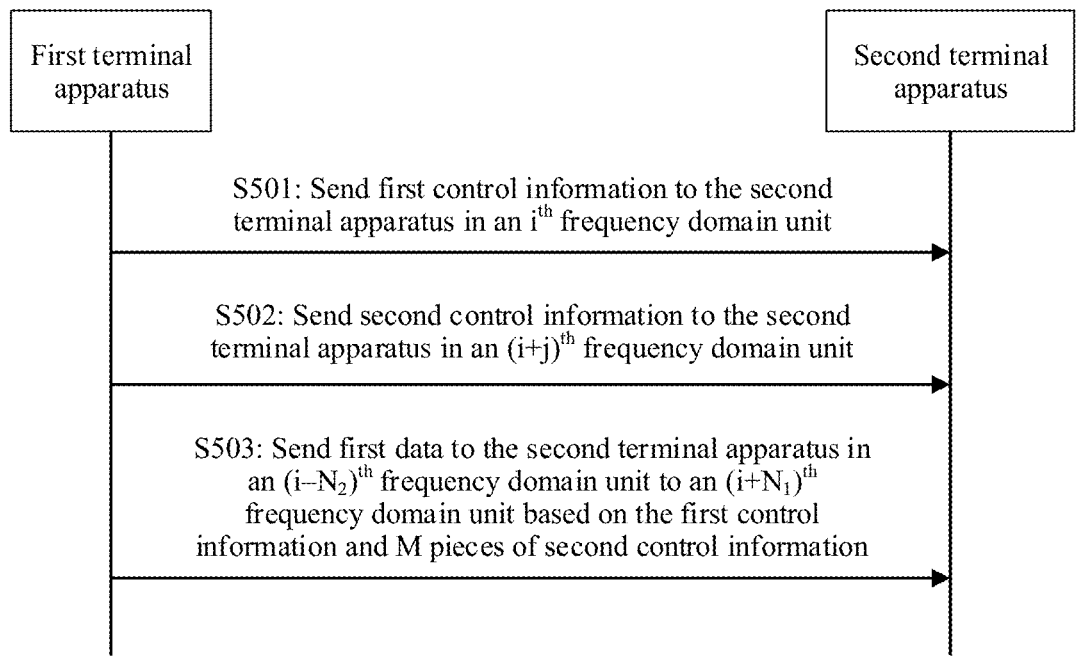
FIG. 9 is a schematic flowchart of a control information sending method according to an embodiment of this application.

FIG. 9 is a schematic flowchart of a control information sending method according to an embodiment of this application. This embodiment of this application includes at least the following steps.

S901: A first terminal apparatus sends first control information to a second terminal apparatus in an $i^{th}$ frequency domain unit, and the second terminal apparatus receives, in the $i^{th}$ frequency domain unit, the first control information sent by the first terminal apparatus, where i is an integer greater than or equal to 0, and the first control information includes resource indication information and decoding information.

S902: The first terminal apparatus sends second control information to the second terminal apparatus in an $(i+j)^{th}$ frequency domain unit, and the second terminal apparatus receives, in the $(i+j)^{th}$ frequency domain unit, the second control information sent by the first terminal apparatus, where j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information includes the resource indication information.

The frequency domain unit may be a carrier, a subcarrier, a bandwidth part (BWP), or the like. The first control information and the second control information may be carried on a PSCCH. The first control information is normal control information, and the first control information may include not only the resource indication information, for example, resource reservation information and a resource priority, but also the decoding information of a data channel, for example, retransmission related information HARQ and a modulation and coding scheme. The second control information is simplified control information, and may include only the resource indication information, but does not include the decoding information of the data channel. Therefore, a signaling length of the second control information is reduced.

Optionally, the first control information includes first-stage control information and second-stage control information, the second control information includes the first-stage control information, the first-stage control information is the resource indication information, for example, the resource reservation information and the resource priority, and the second-stage control information is the decoding information, for example, the retransmission related information HARQ and the MCS. The first-stage control information is carried on a first-stage control channel, and the second-stage control information is carried on a second-stage control channel. FIG. 6 is a schematic diagram of a two-stage control channel according to an embodiment of this application. A first-stage PSCCH is used to transmit resource indication information such as resource reservation information, a time-frequency resource indication, and a priority, and the first-stage PSCCH may be used as a simplified control channel. A second-stage PSCCH is used to transmit decoding information of a data channel, and the second-stage PSCCH is applicable to scenarios, such as unicast and multicast services, that need other special signaling.

Optionally, the second control information may be newly defined sidelink control information, and the newly defined sidelink control information may include the decoding information.

It should be noted that the first control information and the second control information may be configured by a network device (for example, a base station) and then sent to the first terminal device, or may be configured by the first terminal device.

Figure 10:
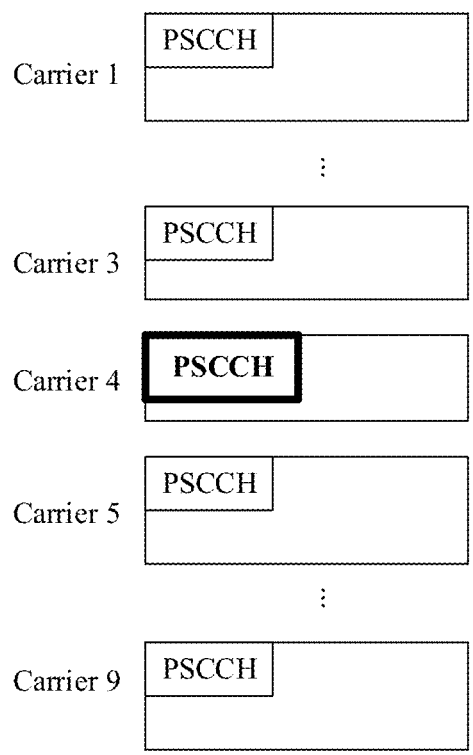
FIG. 10 is a schematic diagram of still another PSCCH configuration according to an embodiment of this application.

Optionally, when M is equal to $N_1+N_2$, the first terminal apparatus may send the second control information to the second terminal apparatus in an $(i-N_2)^{th}$ frequency domain unit to an $(i-1)^{th}$ frequency domain unit and an $(i+1)^{th}$ frequency domain unit to an $(i+N_1)^{th}$ frequency domain unit. M is a quantity of pieces of second control information, and M is an integer greater than or equal to 1 and less than or equal to N. For example, FIG. 10 is a schematic diagram of a PSCCH configuration according to an embodiment of this application. If the first terminal apparatus uses nine carriers (a carrier 1 to a carrier 9) to transmit a same data packet, the first terminal apparatus may send the first control information on the carrier 4, and send the second control information on the carrier 1 to the carrier 3 and the carrier 5 to the carrier 9.

Figure 11:
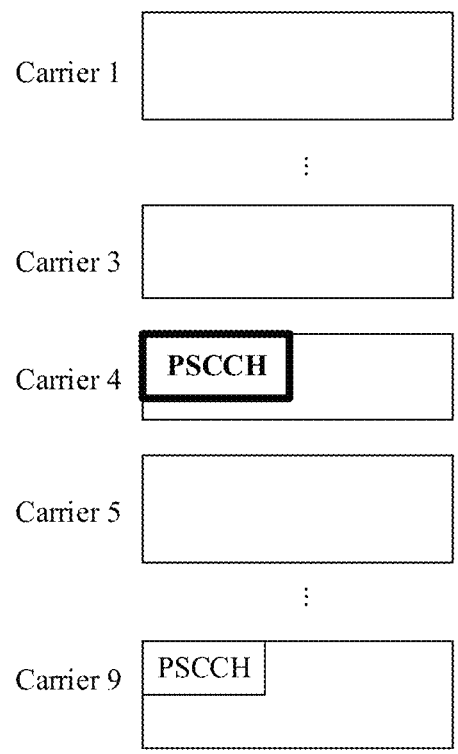
FIG. 11 is a schematic diagram of still another PSCCH configuration according to an embodiment of this application.

Optionally, when M is equal to 1, the first terminal apparatus sends the second control information to the second terminal apparatus in an $(i+N_1)^{th}$ frequency domain unit, that is, sends the second control information only in the last frequency domain unit. For example, FIG. 11 is a schematic diagram of another PSCCH configuration according to an embodiment of this application. If the first terminal apparatus uses nine carriers (a carrier 1 to a carrier 9) to transmit a same data packet, the first terminal apparatus may send the first control information on the carrier 4, and send the second control information on the carrier 9 (the last carrier), but no control information is carried on the carrier 1 to the carrier 3 and the carrier 5 to the carrier 8. In this way, not only a resource collision probability is reduced, but also signaling overheads can be further reduced.

Optionally, the first control information includes indication information, and the indication information is used to indicate frequency domain unit positions of M pieces of second control information in the $(i-N_2)^{th}$ frequency domain unit to the $(i-1)^{th}$ frequency domain unit and the $(i+1)^{th}$ frequency domain unit to the $(i+N_1)^{th}$ frequency domain unit. The indication information is added to the first control information placed in the $i^{th}$ frequency domain unit, to indicate a configuration status of the second control information in another frequency domain unit. If the first control information in the $i^{th}$ frequency domain unit is successfully decoded, blind detection complexity of the second control information placed in another frequency domain unit can be reduced. If the first control channel in the $i^{th}$ frequency domain unit is unsuccessfully decoded, blind detection may be performed on the second control information placed in another frequency domain unit, to obtain periodic resource reservation information. This avoids a collision of resources subsequently scheduled by different users.

By default, if the first control information carries no indication information or does not need to be indicated, the second control information is sent in all aggregated frequency domain units in the $(i-N_2)^{th}$ frequency domain unit to the $(i-1)^{th}$ frequency domain unit and the $(i+1)^{th}$ frequency domain unit to the $(i+N_1)^{th}$ frequency domain unit.

The indication information is an index value, and one or two bits may be used to indicate the index value. For example, two bits are used to indicate an index value, to be specific, bits 00 indicate an index value 0, and bits 01 indicate an index value 1. Specifically, the following cases may be included:

When the index value is 0, the first terminal apparatus sends the second control information to the second terminal apparatus in the $(i+N_1)^{th}$ frequency domain unit, that is, sends the second control information only in the last frequency domain unit. Examples are provided above for description, and details are not described herein again.

When the index value is 1, the first terminal apparatus sends the second control information in an even frequency domain unit in the $(i-N_2)^{th}$ frequency domain unit to the $(i+N_1)^{th}$ frequency domain unit except the $i^{th}$ frequency domain unit. For example, if the first terminal apparatus uses nine carriers (a carrier 1 to a carrier 9) to transmit a same data packet, when the index value is 1, the first terminal apparatus may send the first control information on the carrier 4 and send the second control information on the carrier 2, the carrier 6, and the carrier 8, but no control information is carried on the carrier 1, the carrier 3, the carrier 5, the carrier 7, and the carrier 9.

When the index value is 2, the first terminal apparatus sends the second control information in an odd frequency domain unit in the $(i-N_2)^{th}$ frequency domain unit to the $(i+N_1)^{th}$ frequency domain unit except the $i^{th}$ frequency domain unit. For example, if the first terminal apparatus uses nine carriers (a carrier 1 to a carrier 9) to transmit a same data packet, when the index value is 2, the first terminal apparatus may send the first control information on the carrier 4 and send the second control information on the carrier 1, the carrier 3, the carrier 5, the carrier 7, and the carrier 9, but no control information is carried on the carrier 2, the carrier 6, and the carrier 8.

When the index value is 3, the first terminal apparatus sends the second control information in the $(i-N_2)^{th}$ frequency domain unit to the $(i+N_1)^{th}$ frequency domain unit except the $i^{th}$ frequency domain unit. For example, if the first terminal apparatus uses nine carriers (a carrier 1 to a carrier 9) to transmit a same data packet, when the index value is 3, the first terminal apparatus may send the first control information on the carrier 4, and send the second control information on the carrier 1 to the carrier 3 and the carrier 5 to the carrier 9.

It should be noted that, the indication information includes but is not limited to the foregoing several index values, and may further include another index value, to respectively indicate different frequency domain unit positions.

Optionally, the first terminal apparatus may send the first control information to the second terminal apparatus in a first frequency domain unit, where the first control information includes the resource indication information and the decoding information; and send at least one piece of second control information to the second terminal apparatus in at least one second frequency domain unit, where the second control information includes the resource indication information. A specific implementation method is the same as the foregoing method, and details are not described herein again.

S903: The first terminal apparatus sends first data to the second terminal apparatus in the $(i-N_2)^{th}$ frequency domain unit to the $(i+N_1)^{th}$ frequency domain unit based on the first control information and the M pieces of second control information. After receiving the first control information and the M pieces of second control information, the second terminal apparatus may receive, in the $(i-N_2)^{th}$ frequency domain unit to the $(i+N_1)^{th}$ frequency domain unit based on the first control information and the M pieces of second control information, the first data sent by the first terminal apparatus, and decode the received first data based on the first control information and the M pieces of second control information. M is an integer greater than or equal to 1 and less than or equal to ($N_1+N_2$), and the first data may be a service data packet.

During specific implementation, all frequency domain units in the $(i-N_2)^{th}$ frequency domain unit to the $(i+N_1)^{th}$ frequency domain unit may be aggregated to transmit the first data; or a part of frequency domain units may be selected from the $(i-N_2)^{th}$ frequency domain unit to the $(i+N_1)^{th}$ frequency domain unit, and the part of frequency domain units are aggregated to transmit the first data. The aggregated frequency domain units may be contiguous frequency domain units, or may be discontiguous frequency domain units.

Optionally, M is equal to $N_1+N_2$, and the first terminal apparatus sends the first data to the second terminal apparatus in the $(i-N_2)^{th}$ frequency domain unit to the $(i+N_1)^{th}$ frequency domain unit based on the first control information and $N_1+N_2$ pieces of second control information, that is, aggregates all frequency domain units to transmit a same service data packet. For example, if $N_1=3$, $N_2=5$, and M=8, it may indicate that the first terminal apparatus may send the first control information on the carrier 4, send the second control information on the carrier 1 to the carrier 3 and the carrier 5 to the carrier 9, and aggregate the carrier 1 to the carrier 9 to transmit a same service data packet.

Optionally, M is less than or equal to $N_1+N_2$ and greater than or equal to 1, and the first terminal apparatus may send the first data to the second terminal apparatus in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information, that is, aggregate a part of the frequency domain units to transmit a same service data packet. For example, if $N_1=3$, $N_2=5$, and M=4, it may indicate that the first terminal apparatus may send the first control information on the carrier 4, then randomly select four carriers (for example, the carrier 1, the carrier 2, the carrier 7, and the carrier 8) from the carrier 1 to the carrier 3 and the carrier 5 to the carrier 9, send the second control information on the carrier 1, the carrier 2, the carrier 7, and the carrier 8, and aggregate the carrier 1, the carrier 2, the carrier 7, and the carrier 8 to transmit a same service data packet.

Optionally, the first terminal apparatus sends the first data to the second terminal apparatus in the first frequency domain unit and the at least one second frequency domain unit based on the first control information and the at least one piece of second control information. A specific implementation method is the same as the foregoing method, and details are not described herein again.

In this embodiment of this application, the first control information is sent in the first frequency domain unit, so that the at least one piece of simplified second control information is sent in the at least one second frequency domain unit other than the first frequency domain unit. Therefore, not only a resource collision probability is reduced and system performance is improved, but also signaling overheads can be reduced and control channel decoding reliability can be improved.

The foregoing describes in detail the methods in the embodiments of this application, and the following provides apparatuses in the embodiments of this application.

Figure 12:
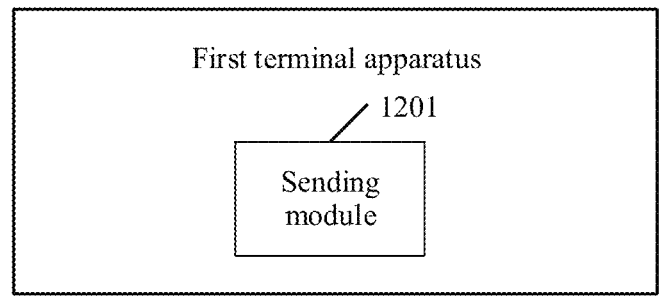
FIG. 12 is a schematic diagram of a structure of a first terminal apparatus according to an embodiment of this application.

FIG. 12 is a schematic diagram of a structure of a first terminal apparatus according to an embodiment of this application. The first terminal apparatus may include a sending module 1201. Detailed descriptions of the modules are as follows:

In an embodiment:

the sending module 1201 is configured to send first control information to a second terminal apparatus in an $i^{th}$ slot, where i is an integer greater than or equal to 0, and the first control information includes resource indication information and decoding information;

the sending module 1201 is further configured to send second control information to the second terminal apparatus in an $(i+j)^{th}$ slot, where j is an integer greater than or equal to 1 and less than or equal to N, N is an integer greater than or equal to 1, and the second control information includes the resource indication information; and the sending module 1201 is further configured to send first data to the second terminal apparatus in the $i^{th}$ slot and an $(i+1)^{th}$ slot to an $(i+N)^{th}$ slot based on the first control information and M pieces of second control information, where M is an integer greater than or equal to 1 and less than or equal to N.

Optionally, M is equal to N, and the sending module 1201 is further configured to send the first data to the second terminal apparatus in the $i^{th}$ slot and the $(i+1)^{th}$ slot to the $(i+N)^{th}$ slot based on the first control information and N pieces of second control information.

Optionally, M is less than or equal to N and greater than or equal to 1, and the sending module 1201 is further configured to send the first data to the second terminal apparatus in M slots in the $i^{th}$ slot and the $(i+1)^{th}$ slot to the $(i+N)^{th}$ slot based on the first control information and the M pieces of second control information.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

Optionally, M is equal to 1, and the sending module 1201 is further configured to send the second control information to the second terminal apparatus in the $(i+N)^{th}$ slot.

The first control information includes indication information, and the indication information is used to indicate slot positions of the M pieces of second control information in the $(i+1)^{th}$ slot to the $(i+N)^{th}$ slot.

Optionally, the indication information is an index value, and the sending module 1201 is further configured to: when the index value is 0, send the second control information to the second terminal apparatus in the $(i+N)^{th}$ slot; or the sending module 1201 is further configured to: when the index value is 1, send the second control information in an even slot in the $(i+1)^{th}$ slot to the $(i+N)^{th}$ slot.

The resource indication information includes at least one of resource reservation information and a resource priority, and the decoding information includes at least one of hybrid automatic repeat request HARQ related information and a modulation and coding scheme MCS.

In another embodiment:

the sending module 1201 is configured to send first control information to a second terminal apparatus in an $i^{th}$ frequency domain unit, where i is an integer greater than or equal to 0, and the first control information includes resource indication information and decoding information;

the sending module 1201 is further configured to send second control information to the second terminal apparatus in an $(i+j)^{th}$ frequency domain unit, where j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information includes the resource indication information; and the sending module 1201 is further configured to send first data to the second terminal apparatus in an $(i-N_2)^{th}$ frequency domain unit to an $(i+N_1)^{th}$ frequency domain unit based on the first control information and M pieces of second control information, where M is an integer greater than or equal to 1 and less than or equal to $(N_1+N_2)$.

Optionally, M is equal to $N_1+N_2$, and the sending module 1201 is further configured to send the first data to the second terminal apparatus in the $(i-N_2)^{th}$ frequency domain unit to the $(i+N_1)^{th}$ frequency domain unit based on the first control information and $N_1+N_2$ pieces of second control information.

Optionally, M is less than or equal to $N_1+N_2$ and greater than or equal to 1, and the sending module 1201 is further configured to send the first data to the second terminal apparatus in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

The first control information includes indication information, and the indication information is used to indicate frequency domain unit positions of the M pieces of second control information in the $(i-N_2)^{th}$ frequency domain unit to an $(i-1)^{th}$ frequency domain unit and an $(i+1)^{th}$ frequency domain unit to the $(i+N_1)^{th}$ frequency domain unit.

Optionally, the indication information is an index value, and the sending module 1201 is further configured to: when the index value is 0, send the second control information to the second terminal apparatus in the $(i+N_1)^{th}$ frequency domain unit;

the sending module 1201 is further configured to: when the index value is 1, send the second control information in an even frequency domain unit in the $(i-N_2)^{th}$ frequency domain unit to the $(i+N_1)^{th}$ frequency domain unit except the $i^{th}$ frequency domain unit;

the sending module 1201 is further configured to: when the index value is 2, send the second control information in an odd frequency domain unit in the $(i-N_2)^{th}$ frequency domain unit to the $(i+N_1)^{th}$ frequency domain unit except the $i^{th}$ frequency domain unit; or the sending module 1201 is further configured to: when the index value is 3, send the second control information in the $(i-N_2)^{th}$ frequency domain unit to the $(i+N_1)^{th}$ frequency domain unit except the $i^{th}$ frequency domain unit.

The resource indication information includes at least one of resource reservation information and a resource priority, and the decoding information includes at least one of hybrid automatic repeat request HARQ related information and a modulation and coding scheme MCS.

It should be noted that, for implementation of each module, refer to corresponding descriptions of the method embodiment shown in FIG. 5 or FIG. 9, and the module performs the methods and the functions performed by the first terminal apparatus in the foregoing embodiments.

Figure 13:
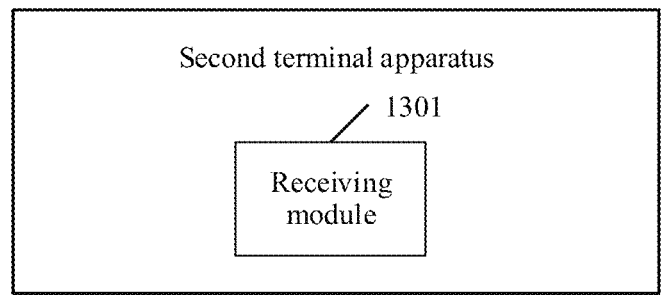
FIG. 13 is a schematic diagram of a structure of a second terminal apparatus according to an embodiment of this application.

FIG. 13 is a schematic diagram of a structure of a second terminal apparatus according to an embodiment of this application. The second terminal apparatus may include a receiving module 1301. Detailed descriptions of the modules are as follows:

In an embodiment:

the receiving module 1301 is configured to receive, in an $i^{th}$ slot, first control information sent by a first terminal apparatus, where i is an integer greater than or equal to 0, and the first control information includes resource indication information and decoding information;

the receiving module 1301 is further configured to receive, in an $(i+j)^{th}$ slot, second control information sent by the first terminal apparatus, where j is an integer greater than or equal to 1 and less than or equal to N, N is an integer greater than or equal to 1, and the second control information includes the resource indication information; and the receiving module 1301 is further configured to receive, in the $i^{th}$ slot and an $(i+1)^{th}$ slot to an $(i+N)^{th}$ slot based on the first control information and M pieces of second control information, first data sent by the first terminal apparatus, where M is an integer greater than or equal to 1 and less than or equal to N.

M is equal to N, and optionally, the receiving module 1301 is further configured to receive, in the $i^{th}$ slot and the $(i+1)^{th}$ slot to the $(i+N)^{th}$ slot based on the first control information and N pieces of second control information, the first data sent by the first terminal apparatus.

M is less than or equal to N and greater than or equal to 1, and optionally, the receiving module 1301 is further configured to receive, in M slots in the $i^{th}$ slot and the $(i+1)^{th}$ slot to the $(i+N)^{th}$ slot based on the first control information and the M pieces of second control information, the first data sent by the first terminal apparatus.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

M is equal to 1, and optionally, the receiving module 1301 is further configured to receive, in the $(i+N)^{th}$ slot, the second control information sent by the first terminal apparatus.

The first control information includes indication information, and the indication information is used to indicate slot positions of the M pieces of second control information in the $(i+1)^{th}$ slot to the $(i+N)^{th}$ slot.

The indication information is an index value, and
optionally, the receiving module 1301 is further configured to: when the index value is 0, receive, in the $(i+N)^{th}$ slot, the second control information sent by the first terminal apparatus; or when the index value is 1, receive the second control information in an even slot in the $(i+1)^{th}$ slot to the $(i+N)^{th}$ slot.

The resource indication information includes at least one of resource reservation information and a resource priority, and the decoding information includes at least one of hybrid automatic repeat request HARQ related information and a modulation and coding scheme MCS.

In another embodiment:

the receiving module 1301 is configured to receive, in an $i^{th}$ frequency domain unit, first control information sent by a first terminal apparatus, where i is an integer greater than or equal to 0, and the first control information includes resource indication information and decoding information.

Optionally, the receiving module 1301 is further configured to receive, in an $(i+j)^{th}$ frequency domain unit, second control information sent by the first terminal apparatus, where j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information includes the resource indication information.

Optionally, the receiving module 1301 is further configured to receive, in an $(i-N_2)^{th}$ frequency domain unit to an $(i+N_1)^{th}$ frequency domain unit based on the first control information and M pieces of second control information, first data sent by the first terminal apparatus, where M is an integer greater than or equal to 1 and less than or equal to $(N_1+N_2)$.

M is equal to $N_1+N_2$, and optionally, the receiving module 1301 is further configured to receive, in the $(i-N_2)^{th}$ frequency domain unit to the $(i+N_1)^{th}$ frequency domain unit based on the first control information and $N_1+N_2$ pieces of second control information, the first data sent by the first terminal apparatus.

M is less than or equal to $N_1+N_2$ and greater than or equal to 1, and optionally, the receiving module 1301 is further configured to receive, in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information, the first data sent by the first terminal apparatus.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

The first control information includes indication information, and the indication information is used to indicate frequency domain unit positions of the M pieces of second control information in the $(i-N_2)^{th}$ frequency domain unit to the $(i+N_1)^{th}$ frequency domain unit except the $i^{th}$ frequency domain unit.

The indication information is an index value, and optionally, the receiving module 1301 is further configured to: when the index value is 0, receive, in the $(i+N_1)^{th}$ frequency domain unit, the second control information sent by the first terminal apparatus; the receiving module 1301 is further configured to: when the index value is 1, receive the second control information in an even frequency domain unit in the $(i-N_2)^{th}$ frequency domain unit to the $(i+N_1)^{th}$ frequency domain unit except the $i^{th}$ frequency domain unit; the receiving module 1301 is further configured to: when the index value is 2, receive the second control information in an odd frequency domain unit in the $(i-N_2)^{th}$ frequency domain unit to the $(i+N_1)^{th}$ frequency domain unit except the $i^{th}$ frequency domain unit; or the receiving module 1301 is further configured to: when the index value is 3, receive the second control information in the $(i-N_2)^{th}$ frequency domain unit to the $(i+N_1)^{th}$ frequency domain unit except the $i^{th}$ frequency domain unit.

The resource indication information includes at least one of resource reservation information and a resource priority, and the decoding information includes at least one of hybrid automatic repeat request HARQ related information and a modulation and coding scheme MCS.

It should be noted that, for implementation of each module, refer to corresponding descriptions of the method embodiment shown in FIG. 5 or FIG. 9, and the module performs the methods and the functions performed by the second terminal apparatus in the foregoing embodiments.

Figure 14:
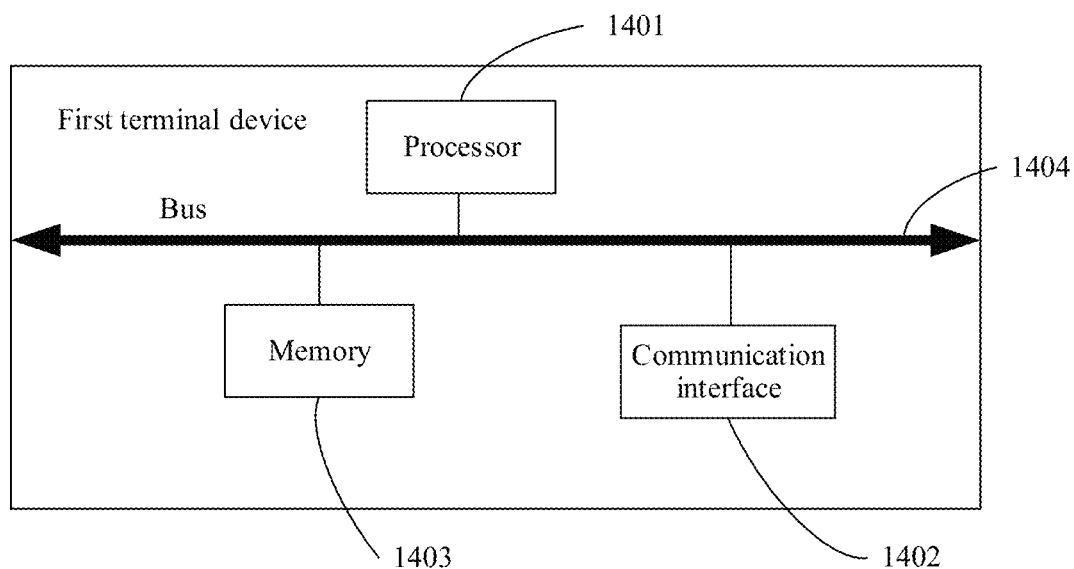
FIG. 14 is a schematic diagram of a structure of a first terminal device according to an embodiment of this application.

FIG. 14 is a schematic diagram of a structure of a first terminal device according to an embodiment of this application. As shown in FIG. 14, the first terminal device may include at least one processor 1401, at least one communication interface 1402, at least one memory 1403, and at least one communication bus 1404.

The processor 1401 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination including one or more microprocessors, or a combination of a digital signal processor and a microprocessor. The communication bus 1404 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 14, but this does not mean that there is only one bus or only one type of bus. The communication bus 1404 is configured to implement connection and communication between these components. The communication interface 1402 of the device in this embodiment of this application is configured to perform signaling or data communication with another node device. The memory 1403 may include a volatile memory, for example, a nonvolatile dynamic random access memory (nonvolatile random access memory, NVRAM), a phase change random access memory (phase change RAM, PRAM), or a magnetoresistive random access memory (magnetoresistive RAM, MRAM). The memory 1403 may further include a nonvolatile memory, for example, at least one magnetic disk storage device, an electrically erasable programmable read-only memory (electrically erasable programmable read-only memory, EEPROM), a flash memory device, for example, a NOR flash memory (NOR flash memory) or a NAND flash memory (NAND flash memory), or a semiconductor device, for example, a solid-state drive (solid state disk, SSD). Optionally, the memory 1403 may be at least one storage apparatus far away from the processor 1401. Optionally, the memory 1403 may further store a group of program code, and optionally, the processor 1401 may further execute a program executed in the memory 1403.

In an embodiment:
the processor 1401 is configured to send first control information to a second terminal apparatus in an $i^{th}$ slot, where i is an integer greater than or equal to 0, and the first control information includes resource indication information and decoding information;
send second control information to the second terminal apparatus in an $(i+j)^{th}$ slot, where j is an integer greater than or equal to 1 and less than or equal to N, N is an integer greater than or equal to 1, and the second control information includes the resource indication information; and
send first data to the second terminal apparatus in the $i^{th}$ slot and an $(i+1)^{th}$ slot to an $(i+N)^{th}$ slot based on the first control information and M pieces of second control information, where M is an integer greater than or equal to 1 and less than or equal to N.

Optionally, the processor 1401 is further configured to perform the following operation:
sending the first data to the second terminal apparatus in the $i^{th}$ slot and the $(i+1)^{th}$ slot to the $(i+N)^{th}$ slot based on the first control information and N pieces of second control information.

Optionally, the processor 1401 is further configured to perform the following operation:
sending the first data to the second terminal apparatus in M slots in the $i^{th}$ slot and the $(i+1)^{th}$ slot to the $(i+N)^{th}$ slot based on the first control information and the M pieces of second control information.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

Optionally, the processor 1401 is further configured to perform the following operation:
sending the second control information to the second terminal apparatus in the $(i+N)^{th}$ slot.

The first control information includes indication information, and the indication information is used to indicate slot positions of the M pieces of second control information in the $(i+1)^{th}$ slot to the $(i+N)^{th}$ slot.

Optionally, the processor 1401 is further configured to perform the following operation:
when the index value is 0, sending the second control information to the second terminal apparatus in the $(i+N)^{th}$ slot; or
when the index value is 1, sending the second control information in an even slot in the $(i+1)^{th}$ slot to the $(i+N)^{th}$ slot.

The resource indication information includes at least one of resource reservation information and a resource priority, and the decoding information includes at least one of hybrid automatic repeat request HARQ related information and a modulation and coding scheme MCS.

In another embodiment:
the processor 1401 is configured to send first control information to a second terminal apparatus in an $i^{th}$ frequency domain unit, where i is an integer greater than or equal to 0, and the first control information includes resource indication information and decoding information;
send second control information to the second terminal apparatus in an $(i+j)^{th}$ frequency domain unit, where j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information includes the resource indication information; and
send first data to the second terminal apparatus in an $(i-N_2)^{th}$ frequency domain unit to an $(i+N_1)^{th}$ frequency domain unit based on the first control information and M pieces of second control information, where M is an integer greater than or equal to 1 and less than or equal to $(N_1+N_2)$.

Optionally, the processor 1401 is further configured to perform the following operation:
sending the first data to the second terminal apparatus in the $(i-N_2)^{th}$ frequency domain unit to the $(i+N_1)^{th}$ frequency domain unit based on the first control information and $N_1+N_2$ pieces of second control information.

Optionally, the processor 1401 is further configured to perform the following operation:
sending the first data to the second terminal apparatus in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

The first control information includes indication information, and the indication information is used to indicate frequency domain unit positions of the M pieces of second control information in the $(i-N_2)^{th}$ frequency domain unit to the $(i+N_1)^{th}$ frequency domain unit except the $i^{th}$ frequency domain unit.

Optionally, the processor 1401 is further configured to perform the following operation:
when the index value is 0, sending the second control information to the second terminal apparatus in the $(i+N_1)^{th}$ frequency domain unit;
when the index value is 1, sending the second control information in an even frequency domain unit in the $(i-N_2)^{th}$ frequency domain unit to the $(i+N_1)^{th}$ frequency domain unit except the $i^{th}$ frequency domain unit;
when the index value is 2, sending the second control information in an odd frequency domain unit in the $(i-N_2)^{th}$ frequency domain unit to the $(i+N_1)^{th}$ frequency domain unit except the $i^{th}$ frequency domain unit; or when the index value is 3, sending the second control information in the $(i-N_2)^{th}$ frequency domain unit to the $(i+N_1)^{th}$ frequency domain unit except the $i^{th}$ frequency domain unit.

The resource indication information includes at least one of resource reservation information and a resource priority, and the decoding information includes at least one of hybrid automatic repeat request HARQ related information and a modulation and coding scheme MCS.

Further, the processor may further cooperate with the memory and the communication interface to perform operations of the first terminal apparatus in the foregoing embodiments of this application.

Figure 15:
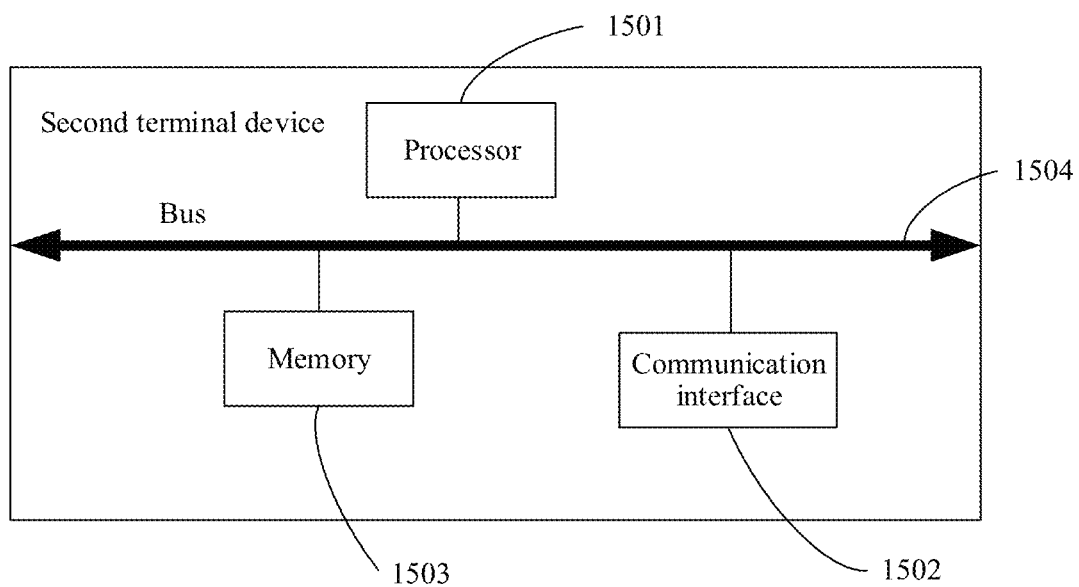
FIG. 15 is a schematic diagram of a structure of a second terminal device according to an embodiment of this application.

FIG. 15 is a schematic diagram of a structure of a second terminal device according to an embodiment of this application. As shown in the figure, the second terminal device may include at least one processor 1501, at least one communication interface 1502, at least one memory 1503, and at least one communication bus 1504.

The processor 1501 may be processors of various types that are mentioned above. The communication bus 1504 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 15, but this does not mean that there is only one bus or only one type of bus. The communication bus 1504 is configured to implement connection and communication between these components. The communication interface 1502 of the device in this embodiment of this application is configured to perform signaling or data communication with another node device. The memory 1503 may be memories of various types that are mentioned above. Optionally, the memory 1503 may be at least one storage apparatus far away from the processor 1501. The memory 1503 stores a group of program code, and the processor 1501 executes a program in the memory 1503.

In an embodiment:

the processor 1501 is configured to receive, in an $i^{th}$ slot, first control information sent by a first terminal apparatus, where i is an integer greater than or equal to 0, and the first control information includes resource indication information and decoding information;

receive, in an $(i+j)^{th}$ slot, second control information sent by the first terminal apparatus, where j is an integer greater than or equal to 1 and less than or equal to N, N is an integer greater than or equal to 1, and the second control information includes the resource indication information; and receive, in the $i^{th}$ slot and an $(i+1)^{th}$ slot to an $(i+N)^{th}$ slot based on the first control information and M pieces of second control information, first data sent by the first terminal apparatus, where M is an integer greater than or equal to 1 and less than or equal to N.

Optionally, the processor 1501 is further configured to perform the following operation:

receiving, in the $i^{th}$ slot and the $(i+1)^{th}$ slot to the $(i+N)^{th}$ slot based on the first control information and N pieces of second control information, the first data sent by the first terminal apparatus.

Optionally, the processor 1501 is further configured to perform the following operation:

receiving, in M slots in the $i^{th}$ slot and the $(i+1)^{th}$ slot to the $(i+N)^{th}$ slot based on the first control information and the M pieces of second control information, the first data sent by the first terminal apparatus.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

Optionally, the processor 1501 is further configured to perform the following operation:

receiving, in the $(i+N)^{th}$ slot, the second control information sent by the first terminal apparatus.

The first control information includes indication information, and the indication information is used to indicate slot positions of the M pieces of second control information in the $(i+1)^{th}$ slot to the $(i+N)^{th}$ slot.

Optionally, the processor 1501 is further configured to perform the following operation:

when the index value is 0, receiving, in the $(i+N)^{th}$ slot, the second control information sent by the first terminal apparatus; or when the index value is 1, receiving the second control information in an even slot in the $(i+1)^{th}$ slot to the $(i+N)^{th}$ slot.

The resource indication information includes at least one of resource reservation information and a resource priority, and the decoding information includes at least one of hybrid automatic repeat request HARQ related information and a modulation and coding scheme MCS.

In an embodiment:

the processor 1501 is configured to receive, in an $i^{th}$ frequency domain unit, first control information sent by a first terminal apparatus, where i is an integer greater than or equal to 0, and the first control information includes resource indication information and decoding information;

receive, in an $(i+j)^{th}$ frequency domain unit, second control information sent by the first terminal apparatus, where j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information includes the resource indication information; and receive, in an $(i-N_2)^{th}$ frequency domain unit to an $(i+N_1)^{th}$ frequency domain unit based on the first control information and M pieces of second control information, first data sent by the first terminal apparatus, where M is an integer greater than or equal to 1 and less than or equal to $(N_1+N_2)$.

Optionally, the processor 1501 is further configured to perform the following operation:

receiving, in the $(i-N_2)^{th}$ frequency domain unit to the $(i+N_1)^{th}$ frequency domain unit based on the first control information and $N_1+N_2$ pieces of second control information, the first data sent by the first terminal apparatus.

Optionally, the processor 1501 is further configured to perform the following operation:

receiving, in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information, the first data sent by the first terminal apparatus.

The first control information includes first-stage control information and second-stage control information, the second control information includes the first-stage control information, the first-stage control information is the resource indication information, and the second-stage control information is the decoding information.

The second control information is newly defined sidelink control information, and the newly defined sidelink control information includes the resource indication information.

The first control information includes indication information, and the indication information is used to indicate frequency domain unit positions of the M pieces of second control information in the $(i-N_2)^{th}$ frequency domain unit to the $(i+N_1)^{th}$ frequency domain unit except the $i^{th}$ frequency domain unit.

Optionally, the processor 1501 is further configured to perform the following operation:

when the index value is 0, receiving, in the $(i+N_1)^{th}$ frequency domain unit, the second control information sent by the first terminal apparatus;

when the index value is 1, receiving the second control information in an even frequency domain unit in the $(i-N_2)^{th}$ frequency domain unit to the $(i+N_1)^{th}$ frequency domain unit except the $i^{th}$ frequency domain unit;

when the index value is 2, receiving the second control information in an odd frequency domain unit in the $(i-N_2)^{th}$ frequency domain unit to the $(i+N_1)^{th}$ frequency domain unit except the $i^{th}$ frequency domain unit; or when the index value is 3, receiving the second control information in the $(i-N_2)^{th}$ frequency domain unit to the $(i+N_1)^{th}$ frequency domain unit except the $i^{th}$ frequency domain unit.

The resource indication information includes at least one of resource reservation information and a resource priority, and the decoding information includes at least one of hybrid automatic repeat request HARQ related information and a modulation and coding scheme MCS.

Further, the processor may further cooperate with the memory and the communication interface to perform operations of the second terminal apparatus in the foregoing embodiments of this application.

An embodiment of this application further provides a chip system. The chip system includes a processor, configured to support a first terminal apparatus or a second terminal apparatus to implement a function in any one of the foregoing embodiments, for example, generating or processing data and/or information in the foregoing methods. In a possible design, the chip system may further include a memory, and the memory is used for program instructions and data that are necessary for the first terminal apparatus or the second terminal apparatus. The chip system may include a chip, or may include a chip and another discrete device.

An embodiment of this application further provides a processor, configured to be coupled to a memory, and configured to perform any method and function performed by the first terminal apparatus or the second terminal apparatus in any one of the foregoing embodiments.

An embodiment of this application further provides a computer program product. When the computer program product runs on a computer, the computer is enabled to perform any method and function performed by the first terminal apparatus or the second terminal apparatus in any one of the foregoing embodiments.

An embodiment of this application further provides a communication apparatus, configured to perform any method and function performed by the first terminal apparatus or the second terminal apparatus in any one of the foregoing embodiments.

An embodiment of this application further provides a communication system. The system includes at least one first terminal apparatus and at least one second terminal apparatus in any one of the foregoing embodiments.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A control information sending method, wherein the method comprises:

sending, by a first terminal apparatus, first control information to a second terminal apparatus in an $i^{th}$ slot, wherein i is an integer greater than or equal to 0, and the first control information comprises resource indication information and decoding information;

sending, by the first terminal apparatus, second control information to the second terminal apparatus in an $(i+j)^{th}$ slot, wherein j is an integer greater than or equal to 1 and less than or equal to N, N is an integer greater than or equal to 1, and the second control information comprises the resource indication information; and sending, by the first terminal apparatus, first data to the second terminal apparatus in the $i^{th}$ slot and an $(i+1)^{th}$ slot to an $(i+N)^{th}$ slot based on the first control information and M pieces of second control information, wherein M is an integer greater than or equal to 1 and less than or equal to N.

2. The method according to claim 1, wherein M is equal to N, and the sending, by the first terminal apparatus, first data to the second terminal apparatus in the $i^{th}$ slot and an $(i+1)^{th}$ slot to an $(i+N)^{th}$ slot based on the first control information and M pieces of second control information comprises:
sending, by the first terminal apparatus, the first data to the second terminal apparatus in the $i^{th}$ slot and the $(i+1)^{th}$ slot to the $(i+N)^{th}$ slot based on the first control information and N pieces of second control information.

3. The method according to claim 1, wherein the sending, by the first terminal apparatus, first data to the second terminal apparatus in the $i^{th}$ slot and an $(i+1)^{th}$ slot to an $(i+N)^{th}$ slot based on the first control information and M pieces of second control information comprises:
sending, by the first terminal apparatus, the first data to the second terminal apparatus in M slots in the $i^{th}$ slot and the $(i+1)^{th}$ slot to the $(i+N)^{th}$ slot based on the first control information and the M pieces of second control information.

4. The method according to claim 1, wherein the first control information comprises first-stage control information and second-stage control information, the second control information comprises the first-stage control information, the first-stage control information is the resource indication information, and the second-stage control information is the decoding information.

5. The method according to claim 1, wherein the second control information is newly defined sidelink control information, and the newly defined sidelink control information comprises the resource indication information.

6. The method according to any claim 1, wherein M is equal to 1, and the sending, by the first terminal apparatus, second control information to the second terminal apparatus in an $(i+j)^{th}$ slot comprises:
sending, by the first terminal apparatus, the second control information to the second terminal apparatus in the $(i+N)^{th}$ slot.

7. The method according to claim 1, wherein the first control information comprises indication information, and the indication information is used to indicate slot positions of the M pieces of second control information in the $(i+1)^{th}$ slot to the $(i+N)^{th}$ slot.

8. The method according to claim 7, wherein the indication information is an index value, and the sending, by the first terminal apparatus, second control information to the second terminal apparatus in an $(i+j)^{th}$ slot comprises:

when the index value is 0, sending, by the first terminal apparatus, the second control information to the second terminal apparatus in the $(i+N)^{th}$ slot; and
when the index value is 1, sending, by the first terminal apparatus, the second control information in an even slot in the $(i+1)^{th}$ slot to the $(i+N)^{th}$ slot.

9. The method according to claim 1, wherein the resource indication information comprises at least one of resource reservation information and a resource priority, and the decoding information comprises at least one of hybrid automatic repeat request HARQ related information and a modulation and coding scheme MCS.

10. A control information sending method, wherein the method comprises:

sending, by a first terminal apparatus, first control information to a second terminal apparatus in an $i^{th}$ frequency domain unit, wherein i is an integer greater than or equal to 0, and the first control information comprises resource indication information and decoding information;
sending, by the first terminal apparatus, second control information to the second terminal apparatus in an $(i+j)^{th}$ frequency domain unit, wherein j is an integer greater than or equal to 1 and less than or equal to $N_1$ or an integer greater than or equal to $-N_2$ and less than or equal to $-1$, both $N_1$ and $N_2$ are integers greater than or equal to 1, and the second control information comprises the resource indication information; and
sending, by the first terminal apparatus, first data to the second terminal apparatus in an $(i-N_2)^{th}$ frequency domain unit to an $(i+N_1)^{th}$ frequency domain unit based on the first control information and M pieces of second control information, wherein M is an integer greater than or equal to 1 and less than or equal to $(N_1+N_2)$.

11. The method according to claim 10, wherein M is equal to $N_1+N_2$, and the sending, by the first terminal apparatus, first data to the second terminal apparatus in an $(i-N_2)^{th}$ frequency domain unit to an $(i+N_1)^{th}$ frequency domain unit based on the first control information and M pieces of second control information comprises:
sending, by the first terminal apparatus, the first data to the second terminal apparatus in the $(i-N_2)^{th}$ frequency domain unit to the $(i+N_1)^{th}$ frequency domain unit based on the first control information and $N_1+N_2$ pieces of second control information.

12. The method according to claim 10, the sending, by the first terminal apparatus, first data to the second terminal apparatus in an $(i-N_2)^{th}$ frequency domain unit to an $(i+N_1)^{th}$ frequency domain unit based on the first control information and M pieces of second control information comprises:
sending, by the first terminal apparatus, the first data to the second terminal apparatus in M frequency domain units in the $i^{th}$ frequency domain unit and the $(i-N_2)^{th}$ frequency domain unit to the $(i+N_1)^{th}$ frequency domain unit except the $i^{th}$ frequency domain unit based on the first control information and the M pieces of second control information.

13. The method according to claim 10, wherein the first control information comprises first-stage control information and second-stage control information, the second control information comprises the first-stage control information, the first-stage control information is the resource indication information, and the second-stage control information is the decoding information.

14. The method according to claim 10, wherein the second control information is newly defined sidelink control information, and the newly defined sidelink control information comprises the resource indication information.

15. The method according to claim 10, wherein the first control information comprises indication information, and the indication information is used to indicate frequency domain unit positions of the M pieces of second control information in the $(i-N_2)^{th}$ frequency domain unit to the $(i+N_1)^{th}$ frequency domain unit except the $i^{th}$ frequency domain unit.

16. The method according to claim 15, wherein the indication information is an index value, and the sending, by the first terminal apparatus, second control information to the second terminal apparatus in an $(i+j)^{th}$ frequency domain unit comprises:

when the index value is 0, sending, by the first terminal apparatus, the second control information to the second terminal apparatus in the $(i+N_1)^{th}$ frequency domain unit;

when the index value is 1, sending, by the first terminal apparatus, the second control information in an even frequency domain unit in the $(i-N_2)^{th}$ frequency domain unit to the $(i+N_1)^{th}$ frequency domain unit except the $i^{th}$ frequency domain unit;

when the index value is 2, sending, by the first terminal apparatus, the second control information in an odd frequency domain unit in the $(i-N_2)^{th}$ frequency domain unit to the $(i+N_1)^{th}$ frequency domain unit except the $i^{th}$ frequency domain unit; and when the index value is 3, sending, by the first terminal apparatus, the second control information in the $(i-N_2)^{th}$ frequency domain unit to the $(i+N_1)^{th}$ frequency domain unit except the $i^{th}$ frequency domain unit.

17. The method according to claim 10, wherein the resource indication information comprises at least one of resource reservation information and a resource priority, and the decoding information comprises at least one of hybrid automatic repeat request HARQ related information and a modulation and coding scheme MCS.

18. A control information receiving method, wherein the method comprises:

receiving, by a second terminal apparatus in an $i^{th}$ slot, first control information sent by a first terminal apparatus, wherein i is an integer greater than or equal to 0, and the first control information comprises resource indication information and decoding information;

receiving, by the second terminal apparatus in an $(i+j)^{th}$ slot, second control information sent by the first terminal apparatus, wherein j is an integer greater than or equal to 1 and less than or equal to N, N is an integer greater than or equal to 1, and the second control information comprises the resource indication information; and receiving, by the second terminal apparatus in the $i^{th}$ slot and an $(i+1)^{th}$ slot to an $(i+N)^{th}$ slot based on the first control information and M pieces of second control information, first data sent by the first terminal apparatus, wherein M is an integer greater than or equal to 1 and less than or equal to N.

19. The method according to claim 18, wherein M is equal to N, and the receiving, by the second terminal apparatus in the $i^{th}$ slot and an $(i+1)^{th}$ slot to an $(i+N)^{th}$ slot based on the first control information and M pieces of second control information, first data sent by the first terminal apparatus comprises:

receiving, by the second terminal apparatus in the $i^{th}$ slot and the $(i+1)^{th}$ slot to the $(i+N)^{th}$ slot based on the first control information and N pieces of second control information, the first data sent by the first terminal apparatus.

20. The method according to claim 18, wherein the receiving, by the second terminal apparatus in the $i^{th}$ slot and an $(i+1)^{th}$ slot to an $(i+N)^{th}$ slot based on the first control information and M pieces of second control information, first data sent by the first terminal apparatus comprises:

receiving, by the second terminal apparatus in M slots in the $i^{th}$ slot and the $(i+1)^{th}$ slot to the $(i+N)^{th}$ slot based on the first control information and the M pieces of second control information, the first data sent by the first terminal apparatus.

* * * * *